(12) United States Patent
Tanomura et al.

(10) Patent No.: US 10,020,682 B2
(45) Date of Patent: Jul. 10, 2018

(54) ELECTRIC POWER TRANSMISSION DEVICE AND ELECTRIC POWER TRANSMISSION METHOD

(71) Applicant: NEC Corporation, Tokyo (JP)

(72) Inventors: Masahiro Tanomura, Tokyo (JP); Shuhei Yoshida, Tokyo (JP); Kaoru Shizuno, Tokyo (JP); Naoki Kobayashi, Tokyo (JP); Hiroshi Fukuda, Tokyo (JP); Yoshinori Hama, Tokyo (JP)

(73) Assignee: NEC Corporation, Tokyo (JP)

( * ) Notice: Subject to any disclaimer, the term of this patent is extended or adjusted under 35 U.S.C. 154(b) by 503 days.

(21) Appl. No.: 14/423,999

(22) PCT Filed: Aug. 21, 2013

(86) PCT No.: PCT/JP2013/072289
§ 371 (c)(1),
(2) Date: Feb. 25, 2015

(87) PCT Pub. No.: WO2014/034491
PCT Pub. Date: Mar. 6, 2014

(65) Prior Publication Data
US 2015/0303702 A1 Oct. 22, 2015

(30) Foreign Application Priority Data
Aug. 31, 2012 (JP) ................................. 2012-191649

(51) Int. Cl.
*H02J 50/12* (2016.01)
*H02J 50/70* (2016.01)
(Continued)

(52) U.S. Cl.
CPC .............. *H02J 50/12* (2016.02); *H01F 27/02* (2013.01); *H01F 38/14* (2013.01); *H02J 7/025* (2013.01);
(Continued)

(58) Field of Classification Search
CPC ........... H02J 5/005; H02J 17/00; H01F 27/02; H01F 38/14; H04B 13/02
(Continued)

(56) References Cited

U.S. PATENT DOCUMENTS 5,926,075 A * 7/1999 Hayashi .................... H01P 1/15
333/101
6,351,626 B1 2/2002 Lohr
(Continued)

FOREIGN PATENT DOCUMENTS

| CN | 102347644 A | 2/2012 |
|---|---|---|
| EA | 006929 B1 | 4/2006 |

(Continued)

OTHER PUBLICATIONS

Extended European Search Report issued by the European Patent Office for Application No. 13834158.1 dated Jul. 18, 2016 (11 pages).
(Continued)

*Primary Examiner* — Brandon S Cole
(74) *Attorney, Agent, or Firm* — Wilmer Cutler Pickering Hale and Dorr LLP

(57) ABSTRACT

An electric power transmission device for wirelessly transmitting electric power in a highly conductive medium includes a power transmitting unit configured to wirelessly transmit electric power and a power receiving unit configured to intromit the wireless electric power transmitted from the power transmitting unit. The power transmitting unit and the power receiving unit include an electric power transmis-
(Continued)

sion coil and a containment member having a dielectric configured to cover the electric power transmission coil, and transmit the electric power by causing resonance at a frequency determined by impedance of the power transmitting unit, impedance of the power receiving unit, and impedance of the highly conductive medium.

4 Claims, 23 Drawing Sheets

(51) Int. Cl.
    *H01F 27/02*     (2006.01)
    *H01F 38/14*     (2006.01)
    *H04B 13/02*     (2006.01)
    *H02J 7/02*     (2016.01)
    *H02J 17/00*     (2006.01)

(52) U.S. Cl.
    CPC .............. *H02J 17/00* (2013.01); *H02J 50/70* (2016.02); *H04B 13/02* (2013.01)

(58) Field of Classification Search
    USPC ........................................................ 307/104
    See application file for complete search history.

(56) References Cited

U.S. PATENT DOCUMENTS

| | | | |
|---|---|---|---|
| 2004/0095291 A1 | 5/2004 | Shigemasa | |
| 2009/0121718 A1* | 5/2009 | Yamamoto | G01R 33/34053 324/322 |
| 2011/0043049 A1 | 2/2011 | Karalis et al. | |
| 2011/0127845 A1* | 6/2011 | Walley | H02J 5/005 307/104 |
| 2012/0025627 A1 | 2/2012 | Shionoiri et al. | |
| 2012/0049986 A1 | 3/2012 | Cho et al. | |
| 2012/0187767 A1* | 7/2012 | Kanno | H02J 17/00 307/82 |
| 2012/0286583 A1* | 11/2012 | Ichikawa | H01L 41/107 307/104 |
| 2013/0057208 A1 | 3/2013 | Takada et al. | |
| 2013/0162205 A1* | 6/2013 | Nakamura | B60L 11/182 320/108 |
| 2013/0321223 A1 | 12/2013 | Bokenfohr et al. | |

FOREIGN PATENT DOCUMENTS

| | | |
|---|---|---|
| EP | 1420357 A1 | 5/2004 |
| EP | 2571133 A1 | 3/2013 |
| JP | 10-108391 | 4/1998 |
| JP | 2004-166384 | 6/2004 |
| JP | 2007-324532 | 12/2007 |
| JP | 2009-095072 A | 4/2009 |
| JP | 2011-022640 | 2/2011 |
| JP | 4772744 | 9/2011 |
| JP | 2011-244530 | 12/2011 |
| JP | 2012-504387 | 2/2012 |
| JP | 2012-050321 | 3/2012 |
| JP | 2012-089618 | 5/2012 |
| RU | 2408476 C2 | 1/2011 |
| RU | 2419945 C2 | 5/2011 |
| WO | WO-2008/117635 A1 | 10/2008 |
| WO | WO-2010-036980 A1 | 4/2010 |
| WO | WO-2011-030804 A1 | 3/2011 |
| WO | WO-2012-014787 A1 | 2/2012 |
| WO | WO-2012/113757 A1 | 8/2012 |

OTHER PUBLICATIONS

Chinese Office Action issued by the State Intellectual Property Office of the People's Republic of China for Application No. 201380044578.0 dated May 31, 2016 (16 pages).

International Search Report corresponding to PCT/JP2013/072289, dated Sep. 17, 2013, 4 pages.

Russian Office Action issued by the Federal Service for Intellectual Property for Application No. 2015109283/07(014784) dated Apr. 15, 2016 (16 pages).

Japanese Office Action issued by the Japan Patent Office for Japanese Application No. 2014-532950 dated May 8, 2018 (12 pages).

\* cited by examiner

|  | CONDUCTIVITY (S/m) | SPECIFIC DIELECTRIC CONSTANT |
|---|---|---|
| SEAWATER | ABOUT 4 | ABOUT 81 |
| RIVER | ABOUT $10^{-2}$ TO $10^{-1}$ | ABOUT 81 |
| FRESH WATER, TAP WATER | ABOUT $10^{-3}$ TO $10^{-2}$ | ABOUT 81 |
| SOIL (WET) | ABOUT $10^{-2}$ TO $10^{-1}$ | ABOUT 3 TO 6 |
| CONCRETE | ABOUT $10^{-3}$ TO $10^{-2}$ | ABOUT 5 TO 10 |
| SOIL (DRY) | ABOUT $10^{-4}$ TO $10^{-3}$ | ABOUT 3 TO 6 |
|  |  |  |
| *AIR | 0 | ABOUT 1 |

… # ELECTRIC POWER TRANSMISSION DEVICE AND ELECTRIC POWER TRANSMISSION METHOD

CROSS-REFERENCE TO RELATED APPLICATIONS

This application is a national stage application of International Application No. PCT/JP2013/072289 entitled "ELECTRIC POWER TRANSMISSION DEVICE AND ELECTRIC POWER TRANSMISSION METHOD," filed on Aug. 21, 2013, which claims the benefit of the priority of Japanese Patent Application No. 2012-191649, filed on Aug. 31, 2012, the disclosures of each of which are hereby incorporated by reference in their entirety.

TECHNICAL FIELD

The present invention relates to an electric power transmission device and an electric power transmission method.

BACKGROUND ART

In recent years, the spread of resource exploration devices in the sea or marine earthquake sensor networks for early detection of earthquakes has progressed and there has been a high need for electric power supply means for these devices. It is desirable to use wireless electric power transmission technology as the electric power supply means for these devices because they are surrounded by seawater. This is because enabling wireless transmission of electric power obviates the need to expose a metal plug for electric power supply and the possibility of short-circuiting in seawater, which has a conductivity of about 4 siemens per meter (S/m).

In general, a coil obtained by winding a wire a plurality of times is used as means for wirelessly transmitting and receiving electric power. A magnetic flux interlinking the coil is generated by applying alternating current (AC) power to the coil of the power transmitting unit. Further, this magnetic flux generates an induced current in the coil of the power receiving unit by performing interlinking with the coil of the power receiving unit and the transmission of electric power is performed.

Incidentally, in wireless technology, for example, technology for performing communication between a terminal device main body and a detachable electronic device such as a memory card using a wireless millimeter wave signal is disclosed in Patent Document 1. In addition, technology for improving inductance values of a power transmitting unit and a power receiving unit and increasing a distance of electric power transmission using a magnetic member is disclosed in Patent Document 2. In addition, technology for improving mutual inductances of a power transmitting unit and a power receiving unit and increasing a distance of transmission by causing resonance (magnetic field resonance) at the same frequency using a coil having a high quality (Q) value is disclosed in Patent Document 3.

DOCUMENTS OF THE PRIOR ART

Patent Documents

[Patent Document 1]
Japanese Unexamined Patent Application, First Publication No. 2011-022640

[Patent Document 2]
Japanese Patent No. 4772744
[Patent Document 3]
Japanese Unexamined Patent Application, First Publication No. 2012-504387

DISCLOSURE OF INVENTION

Problems to be Solved by the Invention

However, in the wireless electric power transmission technology using the conventional electromagnetic induction technology, it is necessary to shorten a distance between a coil of a power transmitting unit and a coil of a power receiving unit almost to the point of contact so as to efficiently perform electric power transmission. Thus, for example, it is difficult to stably supply electric power because alignment of a ship is not performed with high precision.

On the other hand, even in the above-described long-distance transmission technology, it is obvious that only low electric power transmission efficiency is obtained even when the long-distance transmission technology in the air is applied to seawater. This is based on the fact that conductivity and dielectric constants are significantly different between air and seawater and a mechanism of electric power transmission in the media is different in electric power transmission in the air and electric power transmission in seawater. Also, the conductivity of air is 0 S/m and the specific dielectric constant thereof is about 1. On the other hand, the conductivity of seawater is about 4 S/m and the specific dielectric constant thereof is about 81.

Here, physical differences between the case in which wireless electric power is propagated in the air and the case in which the wireless electric power is propagated in seawater will be briefly described.

First, in the case of electric power transmission in the air, there is substantially no energy consumed during the propagation in the medium (air). In this case, factors decreasing electric power transmission efficiency mainly include conductor loss in a coil, matching loss between the power transmitting unit and the power receiving unit, reflection loss such as a leakage magnetic flux, and radiation loss. In particular, in Patent Document 2, radiation loss is effectively suppressed by adopting a non-radiative phenomenon in which energy is stored in the vicinity of the power transmitting/receiving unit using a coil having a high Q value.

On the other hand, when the medium is seawater, because seawater has fixed conductivity, loss occurs when energy is propagated in the medium. Factors causing the energy loss are based on the conductivity of seawater and an electric field occurring in seawater. That is, the loss occurs when a potential gradient proportional to a product of the conductivity and the electric field occurs in seawater. In addition, because seawater has high conductivity, energy lost without reaching an opposite power receiving unit increases when the energy is non-directionally transmitted from the power transmitting unit in seawater. Therefore, in order to efficiently perform electric power transmission in seawater, it is necessary to have directivity in which opposite coil surfaces are connected and form a flow of energy substantially perpendicular to the coil surface.

In light of the differences of the above-described propagation mechanisms, it is particularly difficult to transmit a millimeter wave signal shown in Patent Document 1 in a highly conductive medium such as seawater. For example, because an attenuation distance in seawater is 100 µm or less in the case of a millimeter wave of 60 GHz, it is impossible to perform propagation of 10 cm or more in seawater.

In addition, even when long-distance transmission is implemented in seawater using a magnetic member or resonance as shown in Patent Document 2, the magnetic flux increases, the number of electric field components radiated in the seawater increases with the magnetic flux, and electric power transmission efficiency does not increase as a result. Further, because of a non-radiative phenomenon, it is fundamentally difficult to implement long-distance transmission in a medium having high conductivity.

In particular, in the case of the conventional magnetic field resonance technology as shown in Patent Document 3, it is possible to efficiently perform energy transmission only by making resonant frequencies of the coil of the power transmitting unit and the coil of the power receiving unit equal in the air. However, because the specific dielectric constant is as large as 81 in seawater, the influence of impedance between the power transmitting unit and the power receiving unit is large and it is difficult to perform energy transmission using only a simple resonance phenomenon of the power transmitting/receiving unit.

Further, various types of media as shown in a table of FIG. 27 also have relatively high conductivity and specific dielectric constants. Therefore, a similar problem may occur even when electric power is transmitted not only in seawater but also in other such media.

Therefore, the present invention provides an electric power transmission device and an electric power transmission method for solving the above-described problems.

Means for Solving the Problem

The present invention has been made to solve the above-described problems and is an electric power transmission device for wirelessly transmitting electric power in a highly conductive medium, the electric power transmission device including: a power transmitting unit configured to wirelessly transmit electric power; and a power receiving unit configured to intromit the wireless electric power transmitted from the power transmitting unit, wherein the power transmitting unit and the power receiving unit include an electric power transmission coil; and a containment member having a dielectric configured to cover the electric power transmission coil, and transmit the electric power by causing resonance at a frequency determined by impedance of the power transmitting unit, impedance of the power receiving unit, and impedance of the highly conductive medium.

In addition, the present invention is an electric power transmission method of wirelessly transmitting electric power in a highly conductive medium, the electric power transmission method including: covering, by a containment member, an electric power transmission coil with a dielectric; wirelessly transmitting, by a power transmitting unit, the electric power; intromitting, by a power receiving unit, the transmitted wireless electric power; and transmitting the electric power by causing resonance at a frequency determined by impedance of the power transmitting unit, impedance of the power receiving unit, and impedance of the highly conductive medium.

Effects of the Invention

According to the present invention, it is possible to minimize the disappearance of electromagnetic energy diffused in a highly conductive medium even when a power transmitting unit and a power receiving unit are in a relatively separated neighboring field and consequently long-distance transmission is enabled in wireless electric power transmission in the highly conductive medium such as seawater.

EMBODIMENTS FOR CARRYING OUT THE INVENTION

First Embodiment

Hereinafter, an electric power transmission device according to the first embodiment of the present invention will be described with reference to the drawings.

Figure 1:
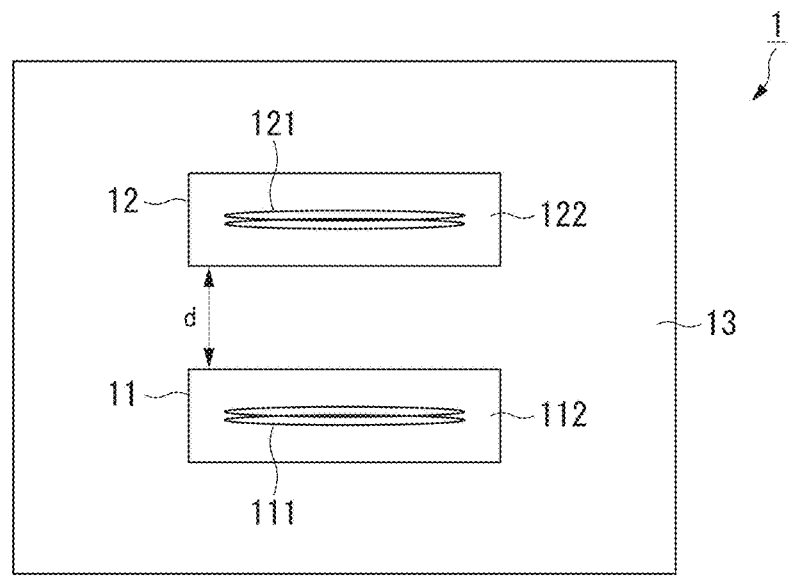
FIG. 1 is a diagram illustrating a configuration of an electric power transmission device according to a first embodiment of the present invention.

FIG. 1 is a diagram illustrating a configuration of the electric power transmission device according to the first embodiment.

In FIG. 1, an electric power transmission device 1 includes a power transmitting unit 11 and a power receiving unit 12. In addition, the power transmitting unit 11 and the power receiving unit 12 are covered with a highly conductive medium 13. The power transmitting unit 11 includes a power transmission coil 111 and a power-transmitting-side containment member 112 constituted of a dielectric configured to cover the power transmission coil 111. In addition, like the power transmitting unit 11, the power receiving unit 12 includes a power reception coil 121 and a power-receiving-side containment member 122. Each of the power transmission coil 111 and the power reception coil 121 is obtained by winding a conductor such as a copper wire a plurality of times. Although a helical coil, a spiral coil, or the like is generally used as the power transmission coil 111 and the power reception coil 121, this embodiment is not limited thereto.

Also, here, the power transmitting unit and the power receiving unit in the electric power transmission device are collectively referred to as an electric power transmission unit. In addition, the power transmission coil and the power reception coil are collectively referred to as an electric power transmission coil. Here, the power transmitting unit may include a function as the power receiving unit and the power receiving unit may include a function as the power transmitting unit. In addition, the power transmitting unit and the power receiving unit have the same configuration.

The power-transmitting-side containment member 112 and the power-receiving-side containment member 122, for example, include a dielectric having a dielectric tangent of 0.01 or less in a specific dielectric constant of about 2 to 10 such as polyethylene, polyimide, polyamide, fluorine resin, or acryl.

In addition, although the highly conductive medium is assumed to be seawater in each embodiment, the present invention is not limited thereto. For example, the highly conductive medium may be a matter having a specific dielectric constant greater than 1 at a conductivity of $1 \times 10^{-4}$ S/m or more such as a river, fresh water, tap water, soil, or concrete shown in the table of FIG. 27.

Figure 2:
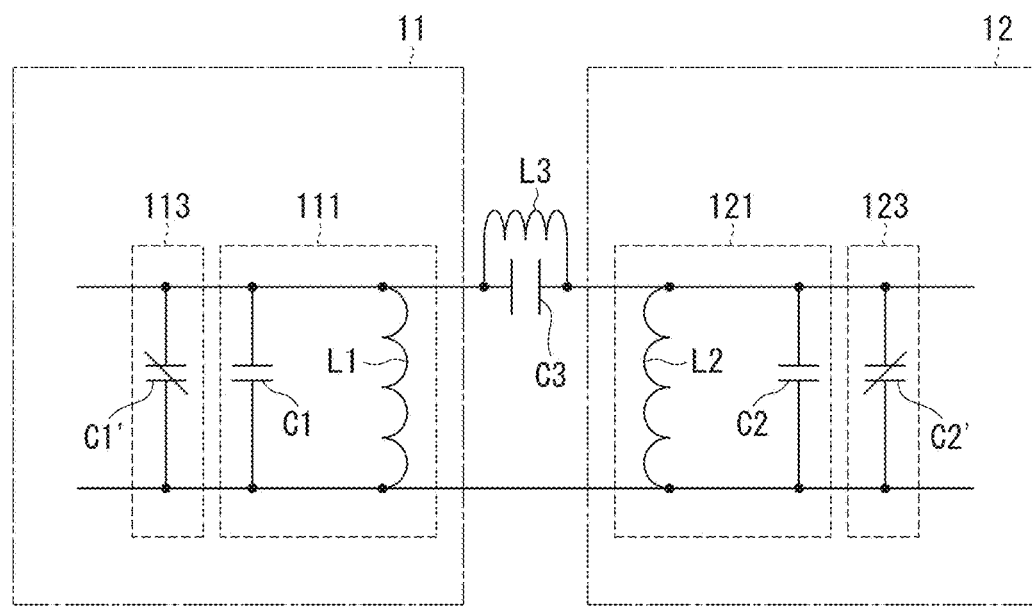
FIG. 2 is an equivalent circuit diagram of wireless electric power when the wireless electric power is propagated from a power transmitting unit to a power receiving unit according to the first embodiment of the present invention.

Here, an equivalent circuit when wireless electric power transmitted from the power transmitting unit 11 is propagated to the power receiving unit 12 is illustrated in FIG. 2.

FIG. 2 is an equivalent circuit diagram for the wireless electric power when the wireless electric power is propagated from the power transmitting unit 11 to the power receiving unit 12.

The power transmitting unit 11 and the power receiving unit 12 further include a power-transmitting-side impedance adjustment unit 113 and a power-receiving-side impedance adjustment unit 123 configured to adjust impedance of the power transmission coil 111 or the power reception coil 121. Here, the impedance of the power transmission coil 111 in the power transmitting unit 11 mainly includes an inductance component L1 and a capacitance component C1, and these are uniquely determined by a coil shape, the number of turns, a thickness of a copper wire, and a dielectric constant and size of a dielectric constituting the power-transmitting-side containment member 112. Likewise, the impedance of the power reception coil 121 in the power receiving unit 12 also includes an inductance component L2 and a capacitance component C2.

Also, in the present document, the power-transmitting-side impedance adjustment unit and the power-receiving-side impedance adjustment unit are collectively referred to simply as an impedance adjustment unit.

AC power supplied to the power transmitting unit 11 is propagated in an equivalent circuit constituted of the above-described L1, L2, C1, and C2, L3, and C3, and propagated to the power receiving unit 12. Here, L3 is a mutual inductance component in the power transmission coil 111 and the power reception coil 121 and C3 is a capacitance component configured in the power transmitting unit 11, the power receiving unit 12, and the highly conductive medium 13.

In terms of transmission efficiency at the time of propagation, whether impedance matching (resonance) is achieved at a frequency of AC power to be propagated through a propagation path is important. Therefore, as illustrated in FIG. 2, it is possible to perform adjustment so that impedance matching is obtained at an arbitrary frequency by adding each of a capacitance component C1' of variable capacitance of the power-transmitting-side impedance adjustment unit 113 and a capacitance component C2' of variable capacitance of the power-receiving-side impedance adjustment unit 123. Thus, even when a positional relationship between the power transmitting unit 11 and the power receiving unit 12 during power transmission varies and a value of C3 fluctuates, it is possible to supply stable electric power by maintaining resonance if C1' and C2' are appropriately adjusted to compensate for this fluctuation.

A varactor diode (variable capacitance diode) can be used in a variant part of capacitance and a plurality of capacitances can be configured to be combined with a switch transistor.

Here, in the following description, a combination capacitance component of a capacitance component provided in the power transmission coil 111 itself and a capacitance component of variable capacitance is newly set as C1. This will be described as the capacitance component C1 constituting the impedance of the power transmitting unit 11. Likewise, a combination capacitance component of a capacitance component of the power reception coil 121 itself and a capacitance component of variable capacitance is newly set as C2. This will be described as the capacitance component C2 constituting the impedance of the power receiving unit 12.

Here, in the electric power transmission device 1 of the first embodiment, it is possible to particularly obtain high electric power transmission efficiency when a predetermined condition is satisfied in terms of a capacitance component C1 constituting the impedance of the power transmitting unit 11, a capacitance component C2 constituting the impedance of the power receiving unit 12, a capacitance component C3 of capacitance formed by the power transmitting unit 11, the power receiving unit 12, and the highly conductive medium 13 present between the power transmitting unit 11 and the power receiving unit 12, and an interval distance d between the power transmitting unit and the power receiving unit.

Figure 3:
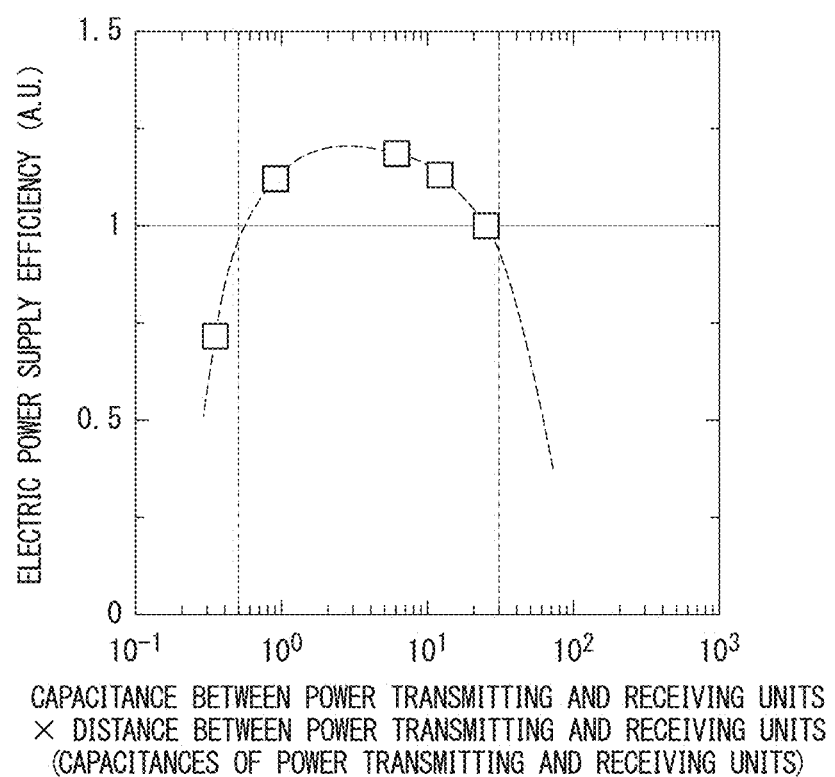
FIG. 3 is a graph illustrating influences of capacitance components of the power transmitting unit and the power receiving unit and a capacitance component generated between the power transmitting and receiving units on electric power transmission efficiency according to the first embodiment of the present invention.

FIG. 3 is a graph illustrating influences of capacitance components of the power transmitting unit 11 and the power receiving unit 12 and a capacitance component generated between the power transmitting and receiving units on electric power transmission efficiency.

From the graph illustrated in FIG. 3, it can be seen that particularly high electric power transmission efficiency is obtained when the above-described C1 [pF], C2 [pF], C3 [pF], and d [cm] satisfy the following condition.

$$30 > \frac{C3 \times d}{(C1 + C2)} > 0.5 \qquad \text{[Math 1]}$$

Also, according to three-dimensional electromagnetic field simulations, in this embodiment, it is possible to satisfy Formula (1) under the condition that areas of the power transmission coil 111 and the power reception coil 121 be about 10 cm² to 30 cm² and the distance d between the power transmitting unit 11 and the power receiving unit 12 be about 5 cm to 30 cm.

In addition, in the first embodiment, it is possible to obtain particularly high electric power transmission efficiency when a dimensional ratio of the power transmission coil 111 and the power-transmitting-side containment member 112 and a dimensional ratio of the power reception coil 121 and the power-receiving-side containment member 122 satisfy a predetermined condition.

Figure 4A:
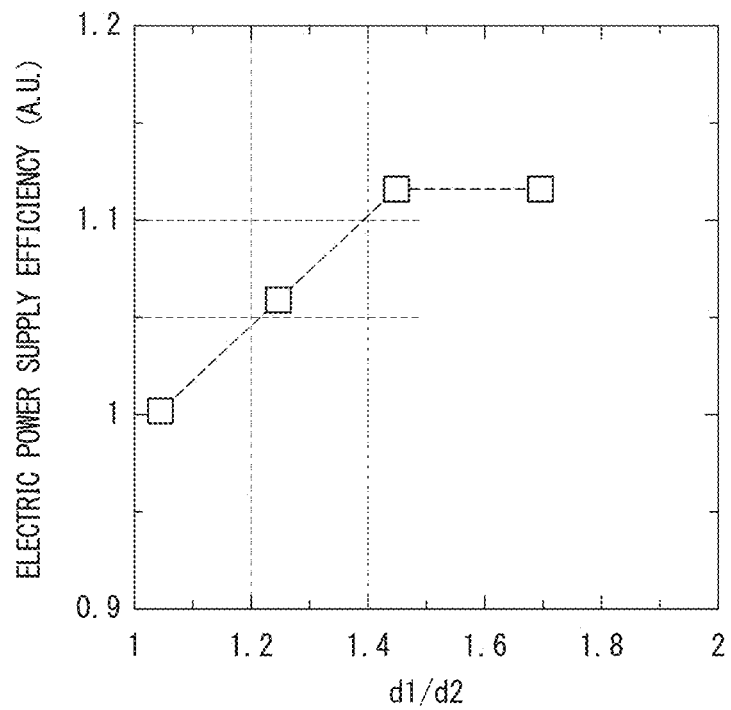
FIG. 4A is a graph illustrating influences of a diameter of a power transmission coil and a dimensional ratio of a power-transmitting-side containment member on electric power transmission efficiency according to the first embodiment of the present invention.
Figure 4B:
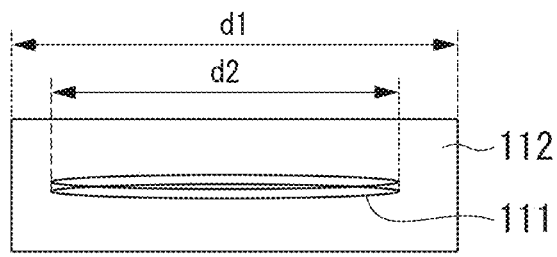
FIG. 4B is a sectional view illustrating the diameter of the power transmission coil and the dimensional ratio of the power-transmitting-side containment member according to the first embodiment of the present invention.

FIG. 4A is a graph illustrating influences of an outer diameter of the power transmission coil 111 and a dimensional ratio of the power-transmitting-side containment member 112 on electric power transmission efficiency. According to FIG. 4A, it is possible to obtain electric power transmission efficiency which is at least 5% more than 1, that is a minimum ratio capable of being produced, by setting a ratio d1/d2 to 1.2 or more in the relationship of the magnitude of the direction along a coil surface of the power-transmitting-side containment member 112 and an outer diameter d2 (FIG. 4B) of the power transmission coil 111. Further, when a high electric power transmission efficiency of 10% or more is desired to be obtained, it is preferable that a value of the ratio d1/d2 be 1.4 or more.

Also, it is possible to obtain similar effects even in the diameter of the power reception coil 121 in the power receiving unit 12 and the dimensional ratio of the power-receiving-side containment member 122. In addition, if both the power transmitting unit 11 and the power receiving unit 12 satisfy the above-described condition, it is possible to obtain a greater effect.

Next, a specific operation of the electric power transmission device 1 according to this embodiment will be sequentially described.

First, in the power transmitting unit 11, an AC power supply (not illustrated) outputs AC power at a predetermined frequency. Next, the output AC power is supplied to the power transmission coil 111 and the power transmission coil 111 transmits the AC power as electromagnetic energy to the outside (the highly conductive medium 13). Next, the power receiving unit 12 intromits the transmitted electromagnetic energy to the power reception coil 121. Here, the power-transmitting-side impedance adjustment unit 113 and the power-receiving-side impedance adjustment unit 123 adjust combination impedance of impedances of the power transmitting unit 11, the power receiving unit 12, and the highly conductive medium 13 so that resonance is at a frequency of electric power to be transmitted. Electric power intromitted by the power reception coil 121 is supplied to a target load (for example, a battery or the like) and electric power transmission is completed.

In the electric power transmission device 1 according to the first embodiment, it is possible to maximize electric power to be intromitted to the power reception coil 121 by causing resonance in the combination impedance of the impedances of the power transmitting unit 11, the power receiving unit 12, and the highly conductive medium 13. In addition, the power-transmitting-side containment member 112 and the power-receiving-side containment member 122 prevent the electric field from extending to the highly conductive medium 13 and therefore there is an effect of minimizing the disappearance of electromagnetic energy diffused into the highly conductive medium 13.

Figure 5:
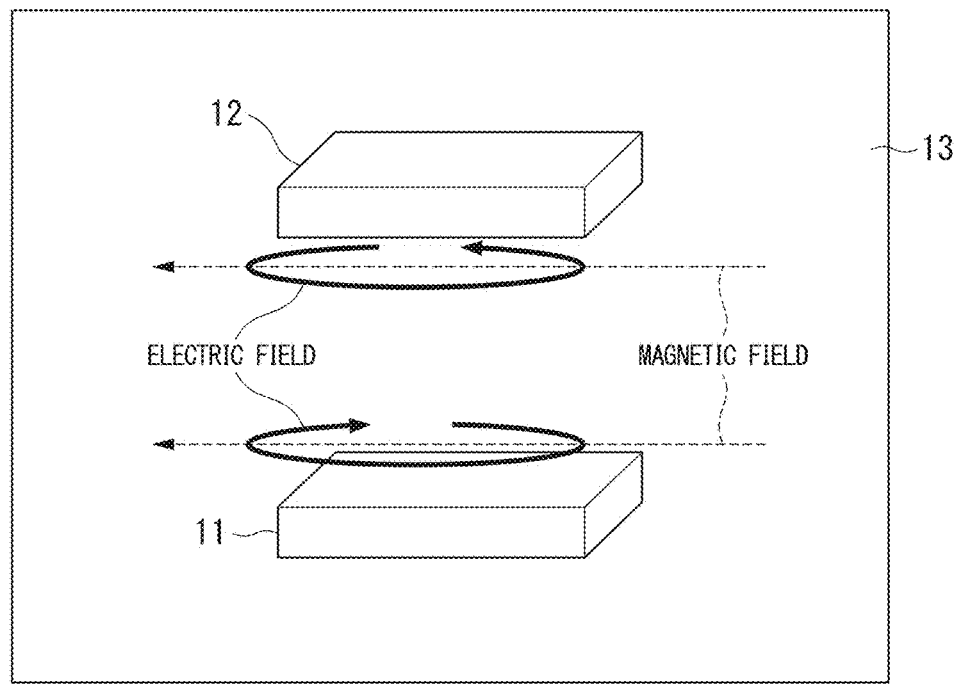
FIG. 5 is a diagram illustrating an electric field vector and a magnetic field vector in the electric power transmission device according to the first embodiment of the present invention.
Figure 6:
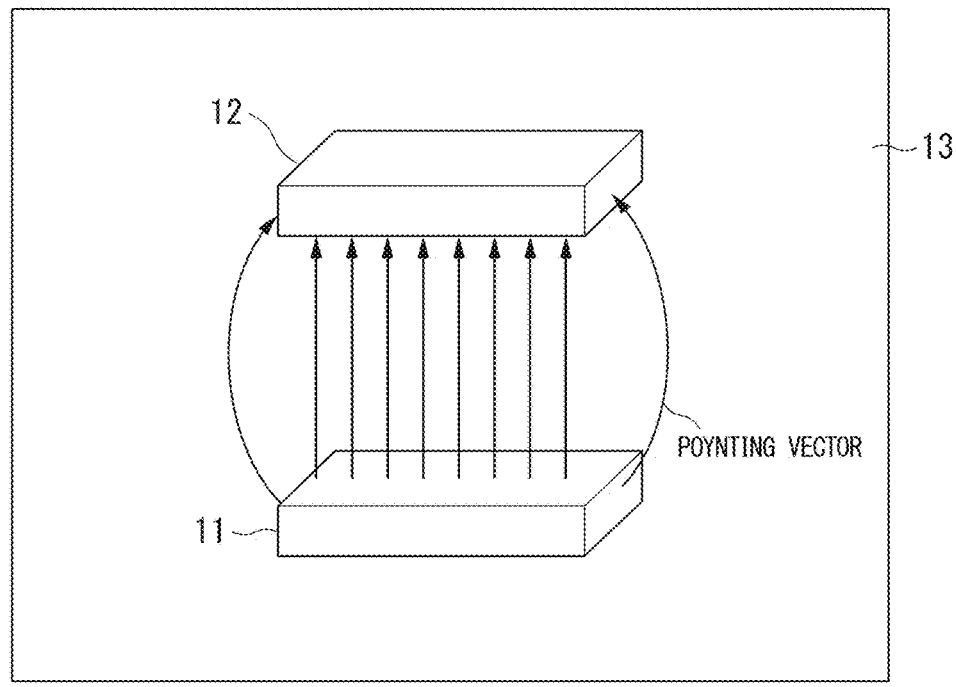
FIG. 6 is a diagram illustrating a Poynting vector (energy flow) generated based on the electric field vector and the magnetic field vector in the electric power transmission device according to the first embodiment of the present invention.

FIG. 5 is a diagram illustrating an electric field vector and a magnetic field vector in the electric power transmission device 1 according to the first embodiment and FIG. 6 is a diagram illustrating a Poynting vector (energy flow) generated based on the electric field vector and the magnetic field vector.

Here, schematic diagrams illustrating simulation results of the electric field and the magnetic field generated between the power transmitting unit 11 and the power receiving unit 12 at the time of electric power transmission are illustrated in FIGS. 5 and 6. As illustrated in FIG. 5, in the electric power transmission device 1 of this embodiment, the electric field and the magnetic field can be substantially parallel to a coil surface. As a result, as illustrated in FIG. 6, it is possible to generate a substantially perpendicular Poynting vector (electromagnetic energy flow) from the power transmitting unit 11 to the power receiving unit 12.

From the above, according to the electric power transmission device 1 based on the first embodiment, it is possible to minimize the disappearance of electromagnetic energy diffused into a highly conductive medium even when the power transmitting unit 11 and the power receiving unit 12 are in a relatively separated neighboring field and consequently long-distance transmission is enabled in wireless electric power transmission in the highly conductive medium such as seawater.

Second Embodiment

Figure 7:
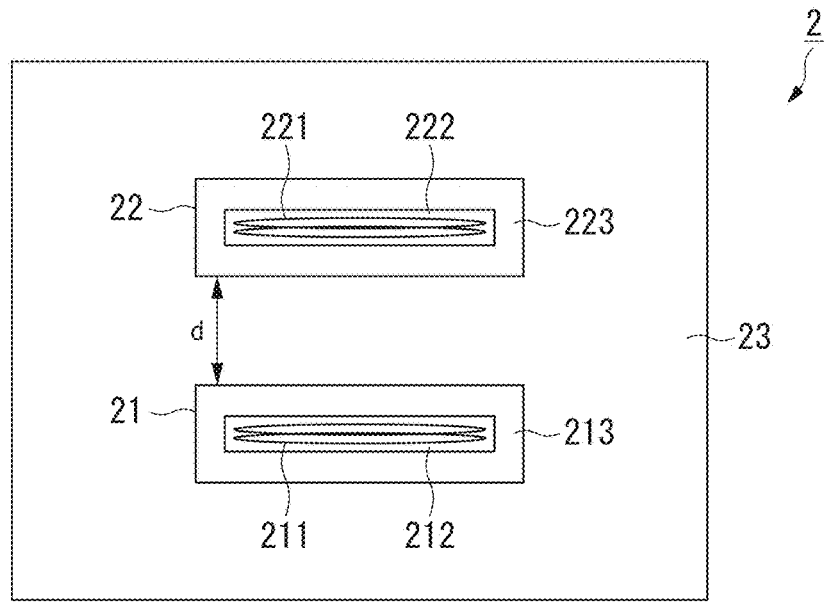
FIG. 7 is a diagram illustrating a configuration of the power transmission device according to a second embodiment of the present invention.

FIG. 7 is a diagram illustrating a configuration of the electric power transmission device according to the second embodiment of the present invention.

Next, the electric power transmission device according to the second embodiment will be described with reference to the drawings.

In FIG. 7, the electric power transmission device 2 includes a power transmitting unit 21 and a power receiving unit 22. In addition, the power transmitting unit 21 and the power receiving unit 22 are covered with a highly conductive medium 23. The power transmitting unit 21 includes a power transmission coil 211 and a first power-transmitting-side containment member 212 constituted of a first dielectric configured to cover the power transmission coil 211, and further includes a second power-transmitting-side containment member 213 constituted of a second dielectric configured to cover the first power-transmitting-side containment member 212. In addition, like the power transmitting unit 21, the power receiving unit 22 includes a power reception coil 221, a first power-receiving-side containment member 222, and a second power-receiving-side containment member 223.

Also, in the present document, the first power-transmitting-side containment member and the first power-receiving-side containment member are collectively referred to as a first containment member and the second power-transmitting-side containment member and the second power-receiving-side containment member are collectively referred to as a second containment member.

The first power-transmitting-side containment member 212, the second power-transmitting-side containment member 213, the first power-receiving-side containment member 222, and the second power-receiving-side containment member 223, for example, include a dielectric having a dielectric tangent of 0.01 or less at a specific dielectric constant of about 2 to 10 such as polyethylene, polyimide, polyamide, fluorine resin, or acryl.

In addition, in the electric power transmission device 2 of the second embodiment, the specific dielectric constant of the first dielectric constituting the first power-transmitting-side containment member 212 and the specific dielectric constant of the second dielectric constituting the second power-transmitting-side containment member 213 may be different or the same. In addition, the dielectric tangent of the first dielectric constituting the first power-transmitting-side containment member 212 and the dielectric tangent of the second dielectric constituting the second power-transmitting-side containment member 213 may be different or the same. The same is true for the first dielectric constituting the first power-receiving-side containment member 222 and the second dielectric constituting the second power-receiving-side containment member 223.

In addition, although both the power transmitting unit 21 and the power receiving unit 22 are disclosed as structures having the first containment member and the second containment member in FIG. 7 illustrating the configuration of the electric power transmission device 2, it is also possible for only one of the power transmitting unit 21 and the power receiving unit 22 to have a structure having the first containment member and the second containment member in the second embodiment.

Further, an impedance adjustment unit described in the first embodiment may also be provided in the electric power transmission device 2 of this embodiment.

Here, in the electric power transmission device 2 of the second embodiment, it is possible to obtain higher electric power transmission efficiency when the dielectric tangents of the dielectrics constituting the first power-transmitting-side containment member 212 and the second power-transmitting-side containment member 213 satisfy a predetermined condition.

Figure 8:
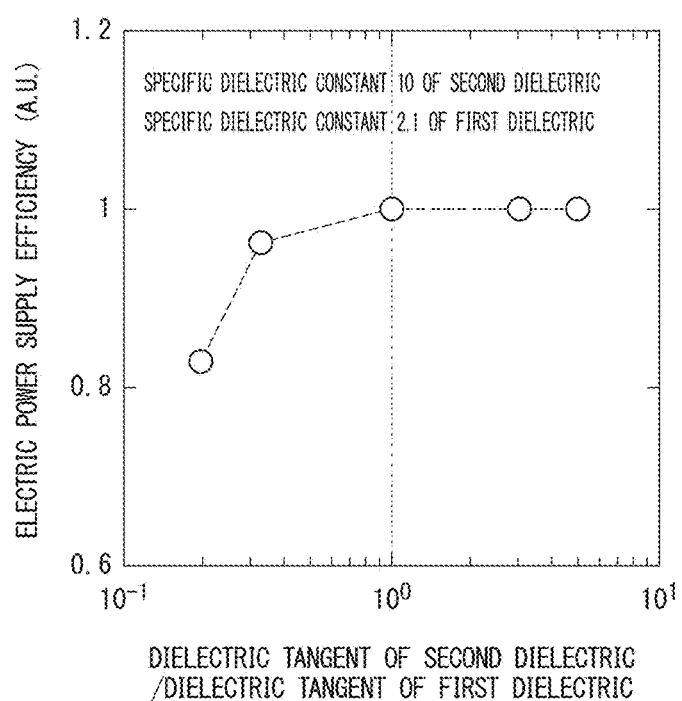
FIG. 8 is a graph illustrating an influence of a ratio between a dielectric tangent of a first dielectric and a dielectric tangent of a second dielectric on electric power transmission efficiency according to the second embodiment of the present invention.

FIG. 8 is a graph illustrating an influence of a ratio between the dielectric tangent of the first dielectric and the dielectric tangent of the second dielectric on electric power transmission efficiency.

As illustrated in FIG. 8, it can be seen that higher electric power transmission efficiency is obtained by making the dielectric tangent of the second dielectric greater than the dielectric tangent of the first dielectric. This enables an effect of preventing the electric field from extending to the highly conductive medium 23 by the second dielectric constituting the second power-transmitting-side containment member 213 (second power-receiving-side containment member 223) to be obtained and is based on an effect of reducing dielectric loss in the vicinity of the power transmission coil 211 (power reception coil 221) by reducing the dielectric tangent of the first dielectric constituting the first power-transmitting-side containment member 212 (first power-receiving-side containment member 222).

In addition, in the electric power transmission device 2 of the second embodiment, it is also possible to obtain higher electric power transmission efficiency when dielectric constants of the dielectrics constituting the first power-transmitting-side containment member 212 and the second power-transmitting-side containment member 213 satisfy a predetermined condition.

Figure 9:
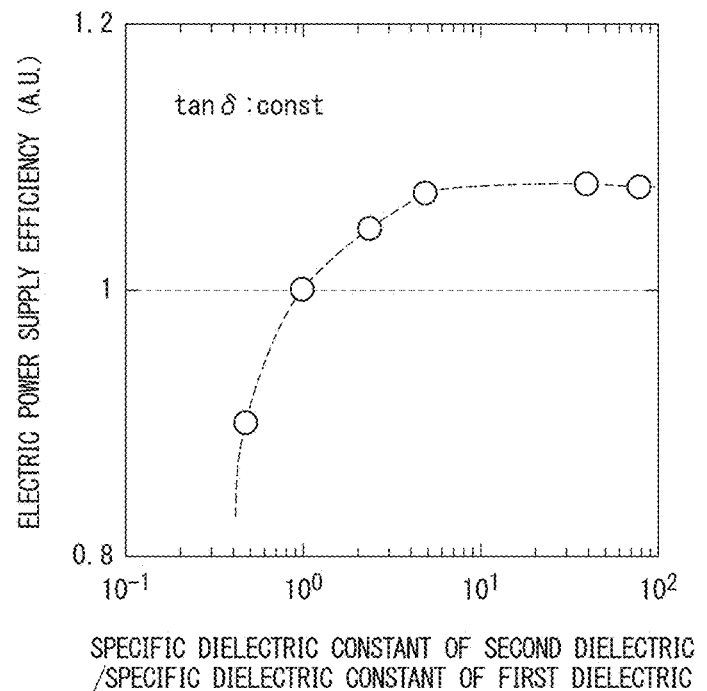
FIG. 9 is a graph illustrating influences of a specific dielectric constant of the first dielectric and a specific dielectric constant of the second dielectric on the electric power transmission efficiency according to the second embodiment of the present invention.

FIG. 9 is a graph illustrating influences of a specific dielectric constant of the first dielectric and a specific dielectric constant of the second dielectric on the electric power transmission efficiency.

As illustrated in FIG. 9, it can be seen that higher electric power transmission efficiency is obtained by making the specific dielectric constant of the second dielectric greater than the specific dielectric constant of the first dielectric.

Next, a specific operation of the electric power transmission device 2 according to the second embodiment will be sequentially described.

First, in the power transmitting unit 21, an AC power supply (not illustrated) outputs AC power at a predetermined frequency. Next, the output AC power is supplied to the power transmission coil 211 and the power transmission coil 211 transmits the AC power as electromagnetic energy to the outside (the highly conductive medium 23). Next, the power receiving unit 12 intromits the transmitted electromagnetic energy to the power reception coil 221. Here, combination impedance of impedances of the power transmitting unit 21, the power receiving unit 22, and the highly conductive medium 23 is adjusted so that resonance is at a frequency of electric power to be transmitted. Electric power intromitted by the power reception coil 221 is supplied to a target load (for example, a battery or the like) and electric power transmission is completed.

In the electric power transmission device 2 according to the second embodiment, it is possible to maximize electric power to be intromitted to the power reception coil 221 by causing resonance in the combination impedance of the impedances of the power transmitting unit 21, the power receiving unit 22, and the highly conductive medium 23.

In addition, the second power-transmitting-side containment member 213 and the second power-receiving-side containment member 223 prevent the electric field from extending to the highly conductive medium 23 and therefore there is an effect of minimizing the disappearance of electromagnetic energy diffused into the highly conductive medium 23.

Thus, there is an effect that the first power-transmitting-side containment member 212 and the first power-receiving-side containment member 222 reduce dielectric loss in the vicinity of the power transmission coil 211 and the power reception coil 221.

As shown above, the electric power transmission device 2 according to the second embodiment can obtain high electric power transmission efficiency as in the electric power transmission device 1 according to the first embodiment.

Third Embodiment

Figure 10:
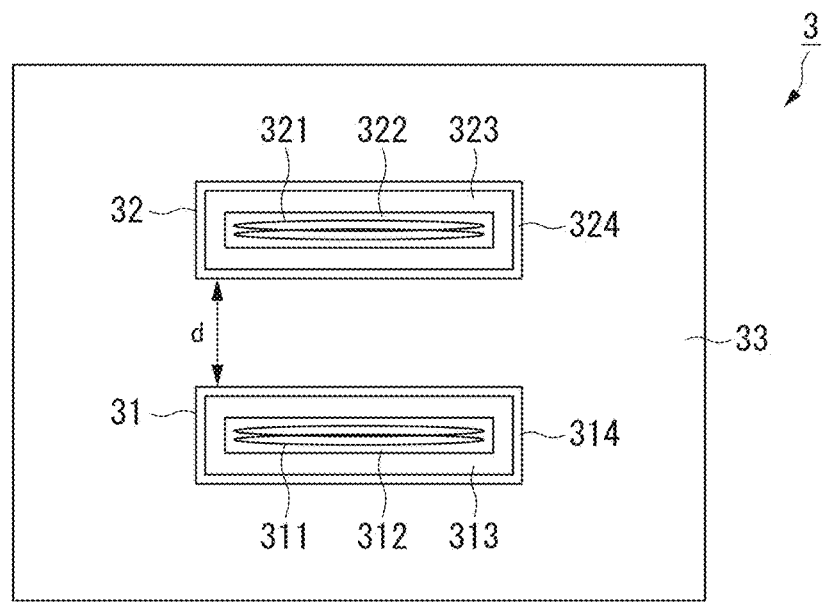
FIG. 10 is a diagram illustrating an electric power transmission device according to a third embodiment of the present invention.

FIG. 10 is a diagram illustrating a configuration of an electric power transmission device according to the third embodiment of the present invention.

Next, the electric power transmission device according to the third embodiment will be described with reference to the drawings.

In FIG. 10, the electric power transmission device 3 includes a power transmitting unit 31 and a power receiving unit 32. In addition, the power transmitting unit 31 and the power receiving unit 32 are covered with a highly conductive medium 33. The power transmitting unit 31 includes a power transmission coil 311 and a first power-transmitting-side containment member 312 constituted of a first dielectric configured to cover the power transmission coil 311, a second power-transmitting-side containment member 313 constituted of a second dielectric configured to cover the first power-transmitting-side containment member 312, and a third power-transmitting-side containment member 314 constituted of a third dielectric configured to cover the second power-transmitting-side containment member 313. In addition, like the power transmitting unit 31, the power receiving unit 32 includes a power reception coil 321, a first power-receiving-side containment member 322, a second power-receiving-side containment member 323, and a third power-receiving-side containment member 324.

Also, in the present document, the third power-transmitting-side containment member and the third power-receiving-side containment member are collectively referred to as a covering member.

The first power-transmitting-side containment member 312, the third power-transmitting-side containment member 314, the first power-receiving-side containment member 322, and the third power-receiving-side containment member 324, for example, include a dielectric having a dielectric tangent of 0.01 or less at a specific dielectric constant of about 2 to 10 such as polyethylene, polyimide, polyamide, fluorine resin, or acryl.

In addition, the second power-transmitting-side containment member 313 and the second power-receiving-side containment member 323 are constituted of a liquid (for example, pure water or distilled water) having the same specific gravity as the highly conductive medium 33 (seawater) and having low conductivity. Thus, the second power-transmitting-side containment member 313 and the second power-receiving-side containment member 323 can provide neutral buoyancy in the highly conductive medium 33 (in seawater). If the second power-transmitting-side containment member 313 or the second power-receiving-side containment member 323 can provide neutral buoyancy, cost reduction can be promoted because it is unnecessary to provide a particular mechanism for adjusting a specific gravity, for example, when the electric power transmission device 3 floats and sinks in the seawater.

In addition, the third power-transmitting-side containment member 314 and the third power-receiving-side containment member 324 constituted of the third dielectric physically confine the second power-transmitting-side containment member 313 and the second power-receiving-side containment member 323 which are liquid.

In addition, in the electric power transmission device 3 of the third embodiment, the specific dielectric constant of the first dielectric constituting the first power-transmitting-side containment member 312, the specific dielectric constant of the second dielectric constituting the second power-transmitting-side containment member 313, and the specific dielectric constant of the third dielectric constituting the third power-transmitting-side containment member 314 may be different or the same. In addition, the dielectric tangent of the first dielectric constituting the first power-transmitting-side containment member 312, the dielectric tangent of the second dielectric constituting the second power-transmitting-side containment member 313, and the dielectric tangent of the third dielectric constituting the third power-transmitting-side containment member 314 may be different or the same. The same is true for the first dielectric constituting the first power-receiving-side containment member 322, the second dielectric constituting the second power-receiving-side containment member 323, and the third dielectric constituting the third power-receiving-side containment member 324.

In addition, although both the power transmitting unit 31 and the power receiving unit 32 are disclosed as structures having the first containment member, the second containment member, and the third containment member in FIG. 10 illustrating the configuration of the electric power transmission device 3, it is also possible for only one of the power transmitting unit 31 and the power receiving unit 32 to have a structure having the first containment member, the second containment member, and the third containment member in this embodiment.

Also, an impedance adjustment unit described in the first embodiment may also be provided in the electric power transmission device 3 according to the third embodiment.

Next, a specific operation of the electric power transmission device 3 according to the third embodiment will be sequentially described.

First, in the power transmitting unit 31, an AC power supply (not illustrated) outputs AC power at a predetermined frequency. Next, the output AC power is supplied to the power transmission coil 311 and the power transmission coil 311 transmits the AC power as electromagnetic energy to the outside (the highly conductive medium 33). Next, the power receiving unit 32 intromits the transmitted electromagnetic energy to the power reception coil 321. Here, combination impedance of impedances of the power transmitting unit 31, the power receiving unit 32, and the highly conductive medium 33 is adjusted so that resonance is at a frequency of electric power to be transmitted. Electric power intromitted by the power reception coil 321 is supplied to a target load (for example, a battery or the like) and electric power transmission is completed.

In the electric power transmission device 3 according to the third embodiment, it is possible to maximize electric power to be intromitted to the power reception coil 321 by causing resonance in the combination impedance of the impedances of the power transmitting unit 31, the power receiving unit 32, and the highly conductive medium 33.

In addition, the second power-transmitting-side containment member 313 and the second power-receiving-side containment member 323 prevent the electric field from extending to the highly conductive medium 33 and therefore there is an effect of minimizing the disappearance of electromagnetic energy diffused into the highly conductive medium 33.

Thus, there is an effect that the first power-transmitting-side containment member 312 and the first power-receiving-side containment member 322 reduce dielectric loss in the vicinity of the power transmission coil 311 and the power reception coil 321.

Further, because the third power-transmitting-side containment member 314 and the third power-receiving-side containment member 324 are provided in the electric power transmission device 3 according to the third embodiment, it is possible to use a liquid (for example, pure water or distilled water) having the same specific gravity as the highly conductive medium 33 (seawater) and having low conductivity in the second power-transmitting-side containment member 313 and the second power-receiving-side containment member 323. Therefore, the power transmitting unit 31 and the power receiving unit 32 can use the second power-transmitting-side containment member 313 and the second power-receiving-side containment member 323 for neutral buoyancy.

As shown above, the electric power transmission device 3 according to the third embodiment can be implemented at a low cost as in the electric power transmission device 1 according to the first embodiment and the electric power transmission device 2 according to the second embodiment because it is unnecessary to provide a separate specific gravity adjustment mechanism.

Example 1

Figure 11:
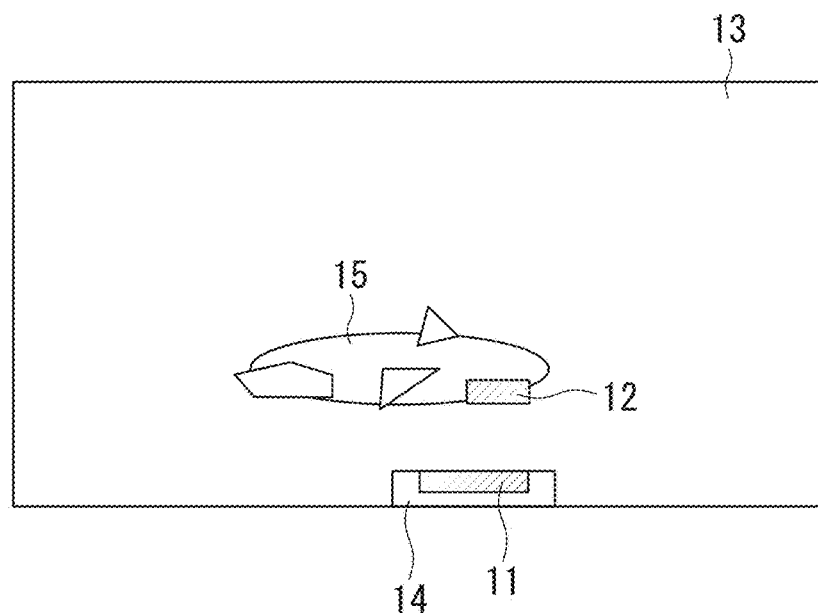
FIG. 11 is a diagram illustrating a first example in the third embodiment of the present invention.

Next, the first example in the third embodiment is illustrated in FIG. 11.

In FIG. 11, the power transmitting unit 11 of the electric power transmission device 1 is provided in an electric power supply source 14 and the power receiving unit 12 is provided in a submarine 15. Even when the tide moves and a positional relationship between the electric power supply source 14 and the submarine 15 fluctuates, it is possible to stably supply electric power using the present invention.

Example 2

Figure 12:
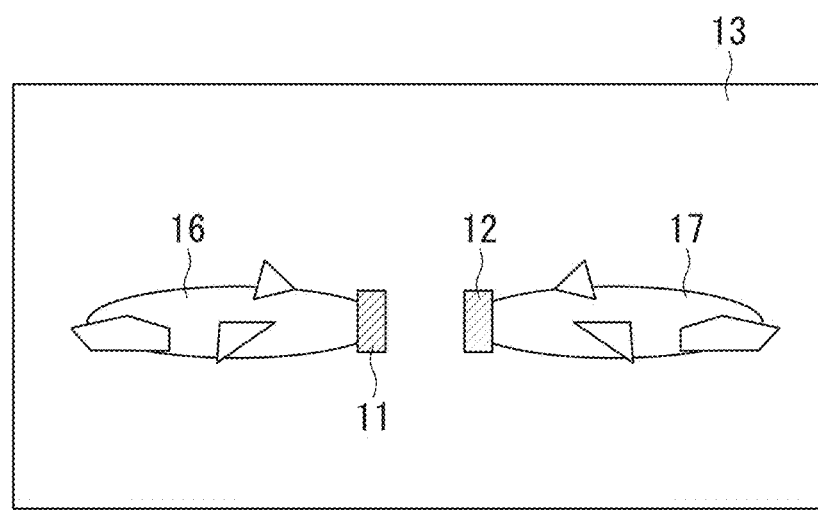
FIG. 12 is a diagram illustrating a second example in the third embodiment of the present invention.

In addition, the second example in the third embodiment is illustrated in FIG. 12.

In FIG. 12, the power transmitting unit 11 of the electric power transmission device 1 is provided in a submarine 16 and the power receiving unit 12 is provided in a submarine 17. Even when the tide moves and a positional relationship between the submarine 16 and the submarine 17 fluctuates, it is possible to stably supply electric power using the present invention.

In addition, the submarines 16 and 17 can bi-directionally supply electric power using the power transmitting unit 11 as a power receiving unit and using the power receiving unit 12 as a power transmitting unit. Alternatively, the submarines 16 and 17 may be provided with both the power transmitting unit 11 and the power receiving unit 12.

Also, the submarine 17 including the power receiving unit 12 may be a sensor device or the like placed in a ship or under the sea.

Example 3

Figure 13:
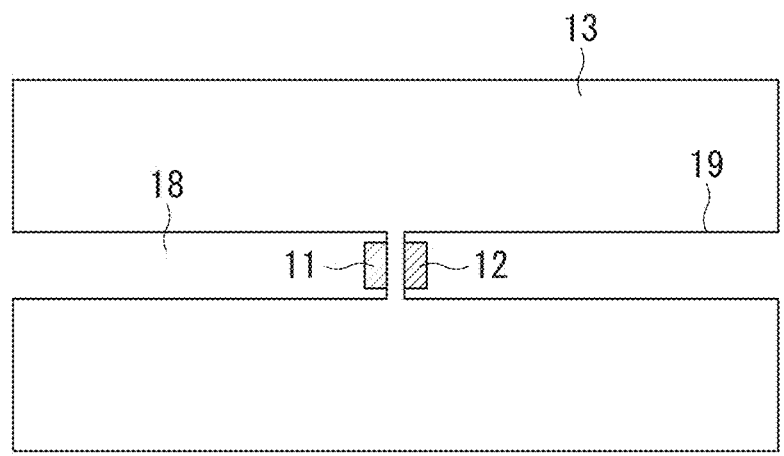
FIG. 13 is a diagram illustrating a third example in the third embodiment of the present invention.

Next, the third example in the third embodiment is illustrated in FIG. 13.

The power transmitting unit 11 is provided in a connection member of a power cable 18 and the power receiving unit 12 is provided in a connection member of a power cable 19. Using the present invention, even in seawater, by wirelessly supplying electric power, a contactless type of connection between the cables can be established, the replacement of the power cable is facilitated, and reliability is also improved without abrasion.

In addition, the power cable 18 and the power cable 19 can bi-directionally supply electric power using the power transmitting unit 11 as the power receiving unit and using the power receiving unit 12 as the power transmitting unit. Further, the above-described power cable 18 and the above-described power cable 19 may be provided with both the power transmitting unit 11 and the power receiving unit 12.

In addition, a function of wirelessly transmitting information to the power transmitting unit 11 and the power receiving unit 12 may be installed. Because it is unnecessary to separately provide a wireless communication mechanism using the power transmitting unit 11 as a transmitter and using the power receiving unit 12 as a receiver, it is possible to implement the system at a low cost in a small size.

Example 4

Figure 14:
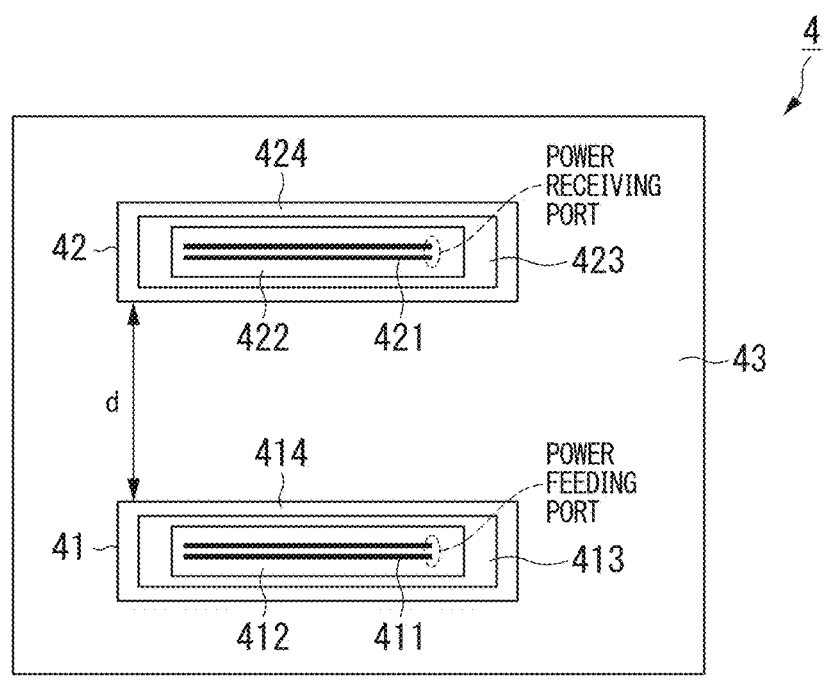
FIG. 14 is a model diagram for simulations for verifying the effect of the electric power transmission device of the first example in the third embodiment of the present invention.

FIG. 14 is a model diagram for simulations for verifying the effect of an electric power transmission device 4 according to the third embodiment.

As the first example of the third embodiment of the present invention, a specific simulation model verifying its effect will be described with reference to FIG. 14.

In FIG. 14, the electric power transmission device 4 includes a power transmitting unit 41 and a power receiving unit 42. In addition, the power transmitting unit 41 and the power receiving unit 42 are covered with the highly conductive medium, seawater 43. The above-described power transmitting unit 41 includes a helical coil (power transmission coil) 411, an internal dielectric (first power-transmitting-side containment member) 412, an external dielectric (second power-transmitting-side containment member) 413, and a covering dielectric (third power-transmitting-side containment member) 414. The above-described power receiving unit 42 includes a helical coil (power reception coil) 421, an internal dielectric (first power-receiving-side containment member) 422, an external dielectric (second power-receiving-side containment member) 423, and a covering dielectric (third power-receiving-side containment member) 424.

Figure 15:
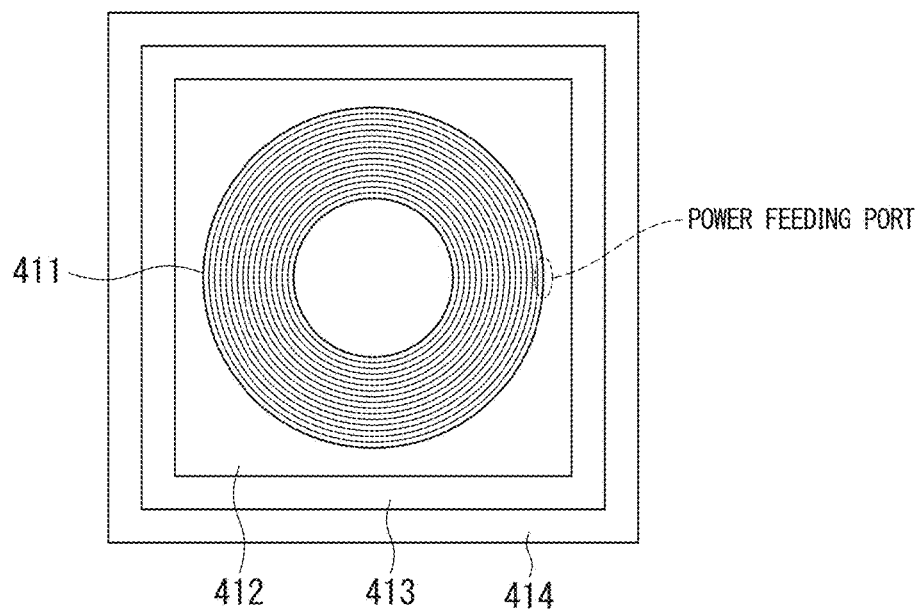
FIG. 15 is a schematic top view of the power transmitting unit in the first example of the third embodiment of the present invention.

FIG. 15 is a schematic top view of the power transmitting unit 41 in the first example of the third embodiment.

The helical coil 411 illustrated in FIG. 15 has a structure in which two single-layer coils, each of which is formed by winding a conducting wire having a diameter of 2 mm 29 times in an outer diameter of 220 mm and an inner diameter of 100 mm, are separated by a distance of 3 mm and face each other.

AC power is applied from a power feeding port to these opposing helical coils. The internal dielectric 412 is formed of a fluorine resin and the covering dielectric 414 is formed of an acryl. Sizes of the covering dielectric 414 are a length of 255 mm, a width of 255 mm, and a height of 19 mm. A resonance frequency of the above-described electric power transmission device 4 is 1 MHz. Here, in this example, even when a ratio d1/d2 between the size d2 of the outer diameter of the helical coil and the size d1 of the covering dielectric is 1.16, which is greater than 1, sufficiently high electric power transmission efficiency is obtained. However, if the ratio of d1/d2 is greater than 1.16, higher electric power transmission efficiency is obtained.

The power receiving unit 42 has the same configuration as the power transmitting unit 41. However, the configuration shown here is an example and similar effects are obtained even when the power transmitting unit 41 and the power receiving unit 42 do not have the same configuration.

Figure 16:
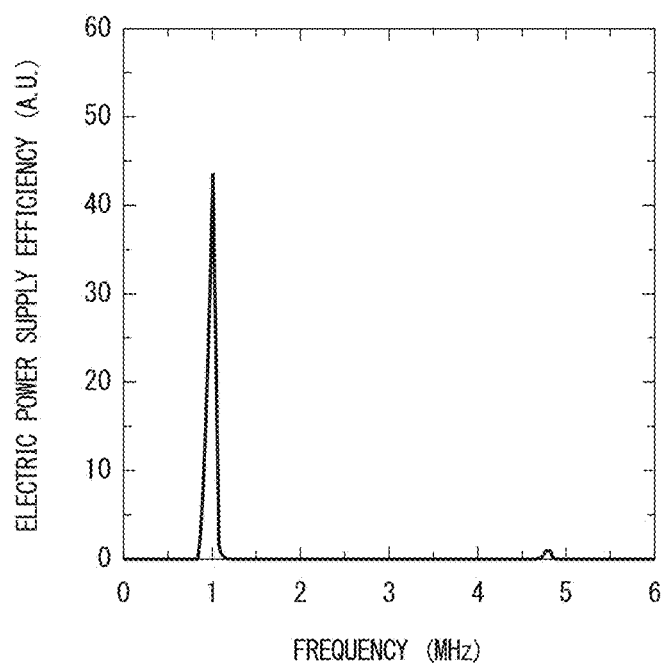
FIG. 16 is a graph illustrating simulation results of electric power transmission efficiency in the first example of the third embodiment of the present invention.

FIG. 16 is a graph illustrating simulation results of electric power transmission efficiency in the first example of the third embodiment.

By setting a distance d between the power transmitting unit 41 and the power receiving unit 42 to 10 cm and simulating electric power transmission efficiency in seawater, it was possible to obtain high electric power transmission efficiency of 40% or more when a frequency f of electric power to be transmitted is in the vicinity of 1 MHz as illustrated in FIG. 16.

Figure 17A:
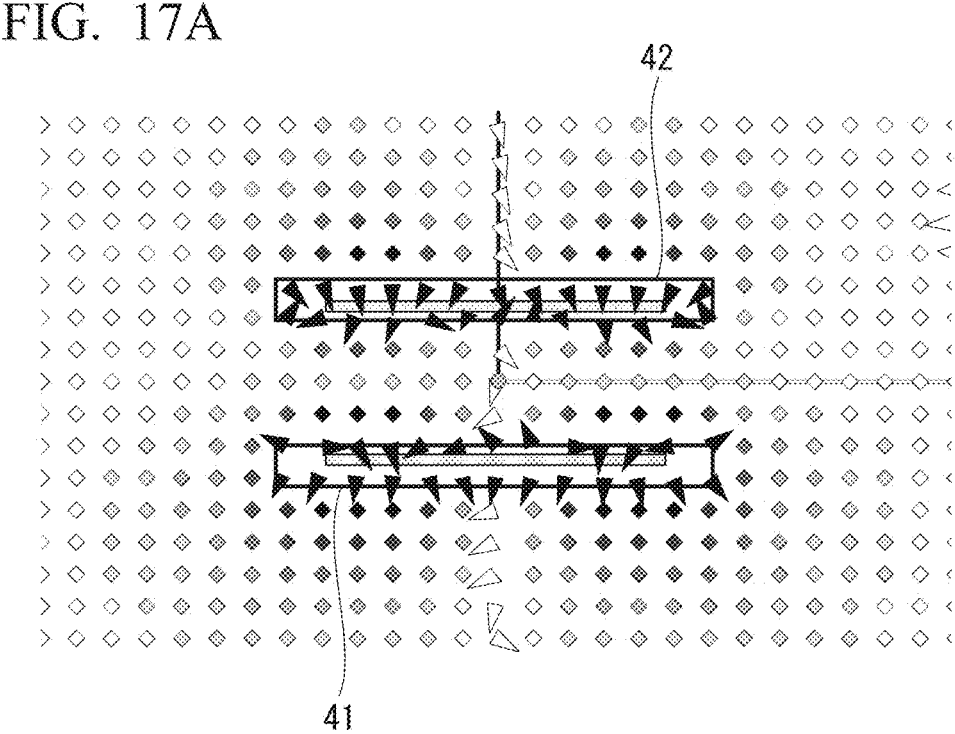
FIG. 17A is a sectional side view illustrating an electric field vector in the vicinity of the power transmitting unit and the power receiving unit in the first example of the third embodiment of the present invention.
Figure 17B:
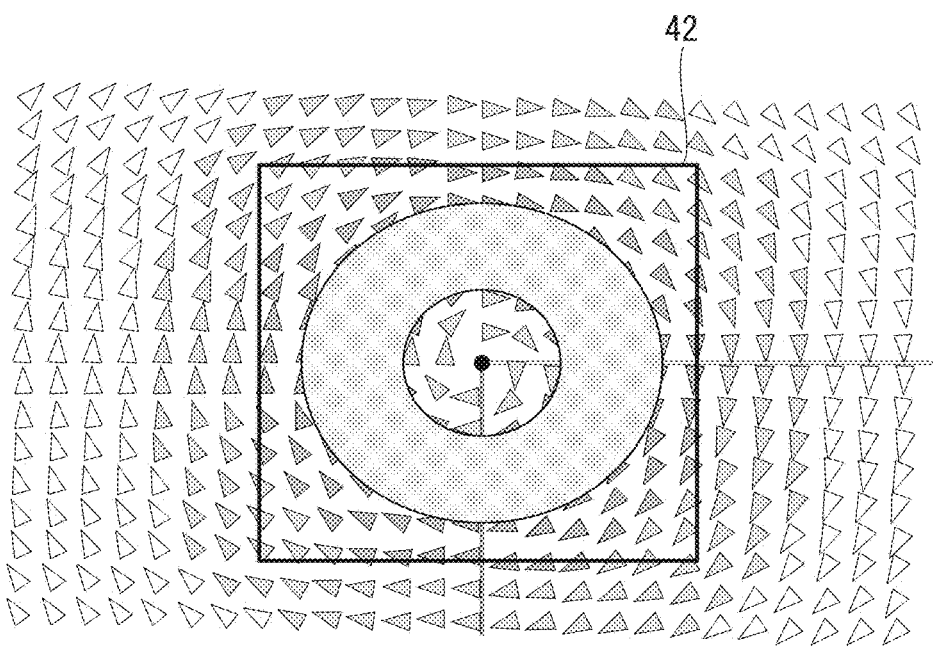
FIG. 17B is a sectional plan view illustrating the electric field vector in the vicinity of the power transmitting unit and the power receiving unit in the first example of the third embodiment of the present invention.
Figure 18A:
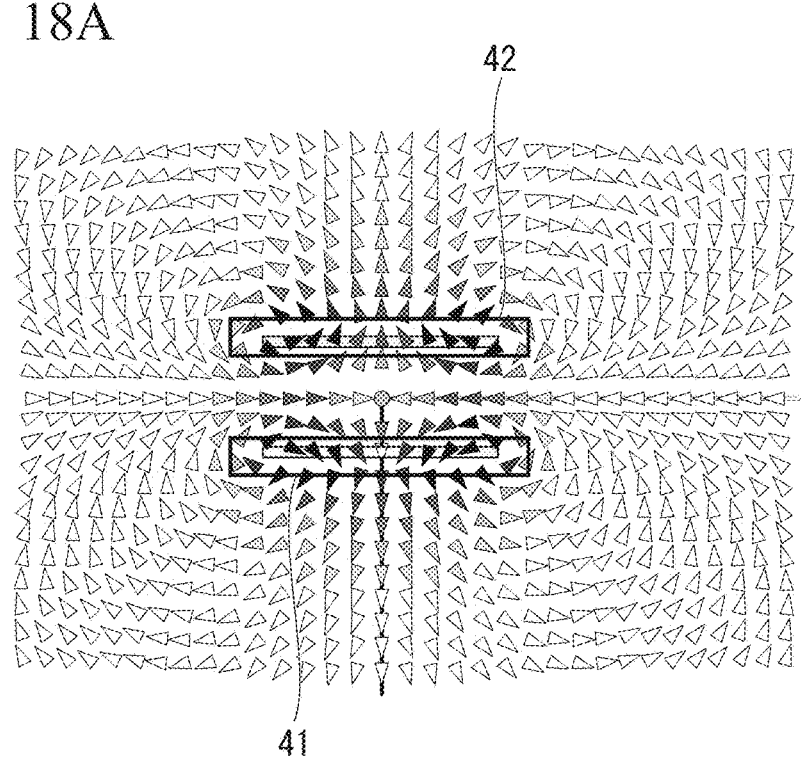
FIG. 18A is a sectional side view illustrating a magnetic field vector in the vicinity of the power transmitting unit and the power receiving unit in the first example of the third embodiment of the present invention.
Figure 18B:
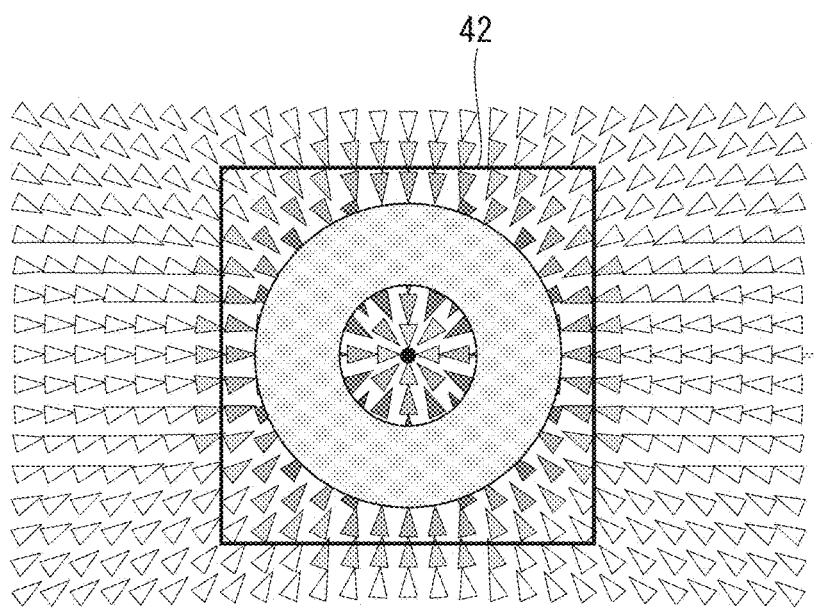
FIG. 18B is a sectional plan view illustrating the magnetic field vector in the vicinity of the power transmitting unit and the power receiving unit in the first example of the third embodiment of the present invention.
Figure 19A:
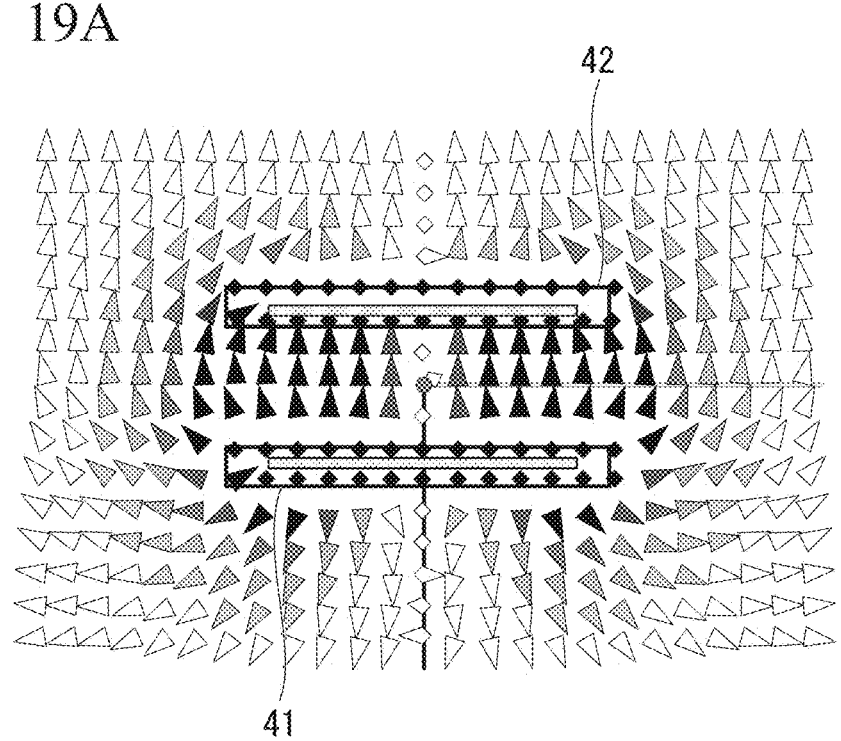
FIG. 19A is a sectional side view illustrating a Poynting vector in the vicinity of the power transmitting unit and the power receiving unit in the first example of the third embodiment of the present invention.
Figure 19B:
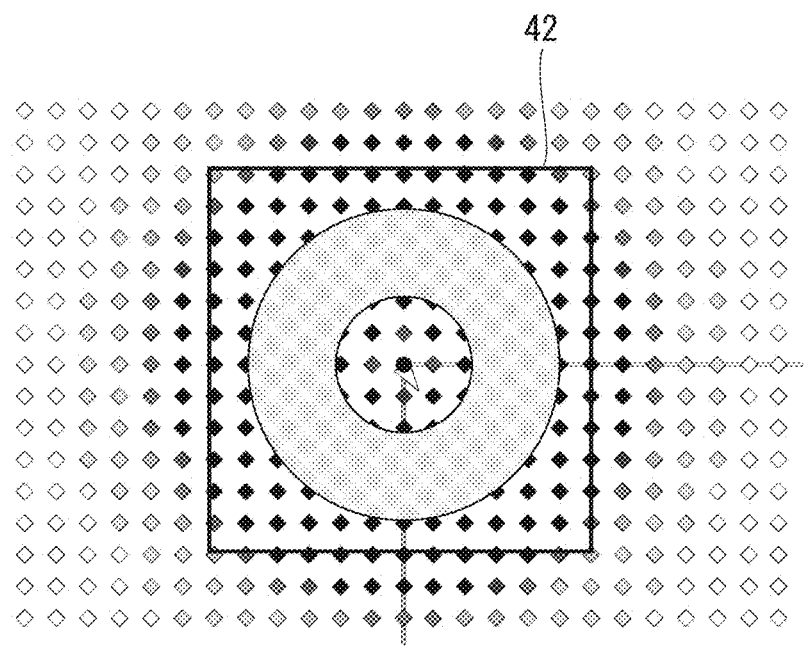
FIG. 19B is a sectional plan view illustrating the Poynting vector in the vicinity of the power transmitting unit and the power receiving unit in the first example of the third embodiment of the present invention.

FIGS. 17A and 17B are views illustrating electric field vectors in the vicinity of the power transmitting unit 41 and the power receiving unit 42 in the first example of the third embodiment, and FIGS. 18A and 18B are views illustrating magnetic field vectors in the vicinity of the power transmitting unit 41 and the power receiving unit 42 in the first example of the third embodiment. FIGS. 19A and 19B are views illustrating Poynting vectors in the vicinity of the power transmitting unit 41 and the power receiving unit 42 in this embodiment.

Results obtained by performing detailed three-dimensional electromagnetic field simulations in terms of an electric field, a magnetic field, and a Poynting vector in the electric power transmission device 4 according to the above-described example will be described with reference to FIGS. 17A to 19B.

In the first example of the third embodiment, the flow of the electric field rotates along a surface parallel to a coil surface as illustrated in FIGS. 17A and 17B, and the flow of the magnetic field is radially generated along the surface parallel to the coil surface as illustrated in FIGS. 18A and 18B. Based on the flows of the electric field and the magnetic field, a Poynting vector (energy flow) substantially perpendicular to the coil surface is generated (FIGS. 19A and 19B). As a result, even in seawater in which a distance between the power transmitting unit 41 and the power receiving unit 42 is separated about 10 cm, the energy flow is formed in a direction substantially perpendicular to the coil surface and the long-distance transmission in the seawater is possible.

Figure 20A:
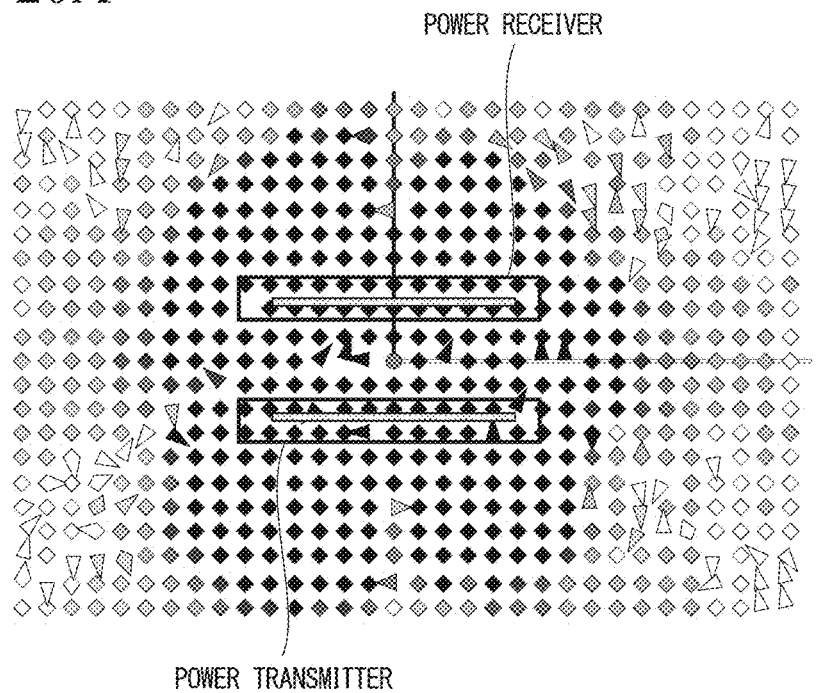
FIG. 20A is a sectional side view illustrating a Poynting vector in the air in the first example of the third embodiment of the present invention.
Figure 20B:
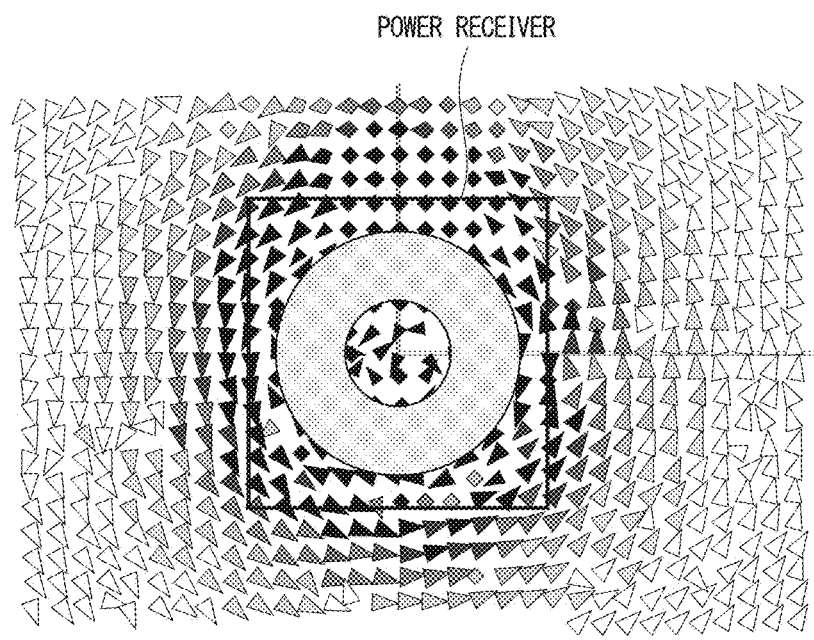
FIG. 20B is a sectional plan view illustrating a Poynting vector in the air in the first example of the third embodiment of the present invention.

FIGS. 20A and 20B are views illustrating Poynting vectors of the electric power transmission device 4 according to the first example of the third embodiment in the air.

Results obtained by simulating the power transmitting unit 41 and the power receiving unit 42 of the electric power transmission device 4 according to this embodiment separated by a distance of 10 cm will be described with reference to FIGS. 20A and 20B.

As illustrated in FIGS. 20A and 20B, the energy flow perpendicular to the surface of the power transmitting/receiving unit does not occur and the energy has a flow that forms a spiral. That is, a phenomenon in which a flow of energy substantially perpendicular to the coil surface occurs is a phenomenon unique to energy that is propagated in the highly conductive medium and is a phenomenon that does not occur when the energy is propagated in the air. That is, the present invention uses a unique phenomenon in which the flow of energy substantially perpendicular to the coil surface occurs.

Figure 21A:
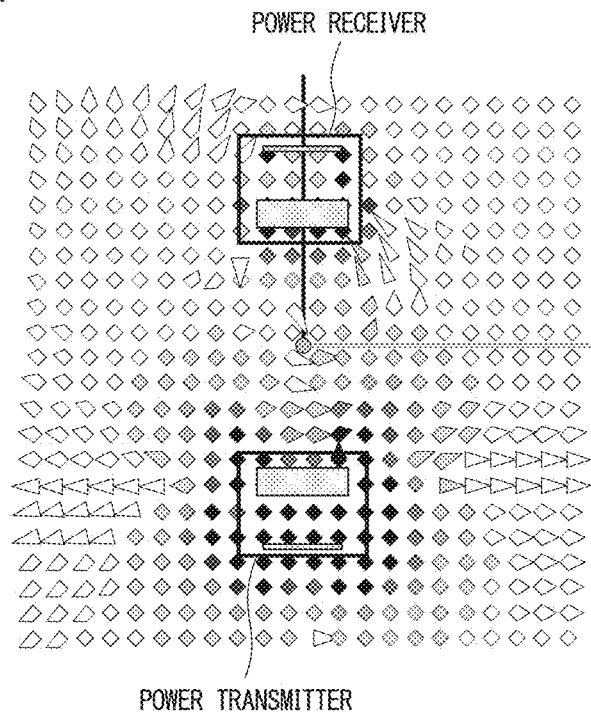
FIG. 21A is a sectional side view illustrating a Poynting vector in the air when conventional magnetic field resonance technology is used.
Figure 21B:
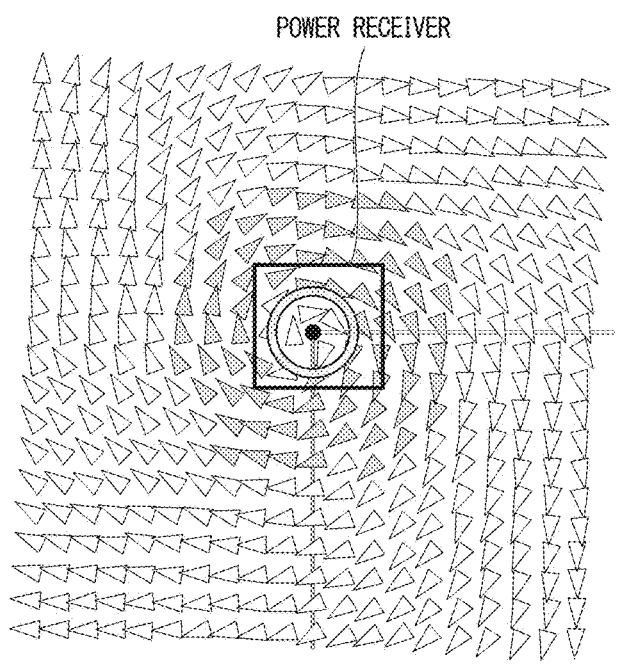
FIG. 21B is a sectional plan view illustrating a Poynting vector in the air when the conventional magnetic field resonance technology is used.

FIGS. 21A and 21B are views illustrating Poynting vectors in the air when conventional magnetic field resonance technology is used.

Next, results obtained by performing simulations in the air using the conventional electromagnetic resonance technology will be described with reference to FIGS. 21A and 21B.

As illustrated in FIGS. 21A and 21B, even in this case, the energy flow perpendicular to the surface of the power transmitting/receiving unit does not occur and the energy has a flow that forms a spiral as in FIGS. 20A and 20B. In this case, the electric power transmission efficiency is 90%. Also, as described already, high electric power transmission efficiency is not obtained even when wireless electric power transmission is attempted in seawater using an electric power transmission device according to the conventional technology. From simulation results, it could be seen that only an electric power transmission efficiency of about 10% at a distance of 10 cm is obtained.

FIGS. 18A and 18B illustrate states of magnetic fields under a phase condition in which interlinkage magnetic fluxes passing through the helical coil 411 and the helical coil 421 of the power transmitting unit 41 and the power receiving unit 42 are maximized.

Physical differences between the conventional electromagnetic resonance technology and the electric power transmission device 4 according to the first example of the third embodiment will be described with reference to FIGS. 18A and 18B.

As illustrated in FIGS. 18A and 18B, the interlinkage magnetic flux passing through the helical coil 411 of the power transmitting unit 41 and the interlinkage magnetic flux passing through the helical coil 421 of the power receiving unit 42 are directed in directions reverse to each other, so that the magnetic field is maximized and the magnetic field parallel to the coil surface is generated.

On the other hand, in the wireless electric power transmission technology using electromagnetic resonance, a resonance frequency is divided into two parts in the case of close coupling and it is generally known that interlinkage magnetic fluxes passing through the coils of the power transmitting unit and the power receiving unit are in anti-phase at a higher resonance frequency. In addition, in the same technology, in a state of loose coupling in which the resonance frequency is not divided, it is generally known that the interlinkage magnetic fluxes passing through the coils of the power transmitting unit and the power receiving unit are in phase.

The present invention is fundamentally different from the conventional electromagnetic resonance technology in that the interlinkage magnetic fluxes passing through antenna coils of the power transmitting unit and the power receiving unit are in anti-phase in a state of loose coupling in which the resonance frequency is not divided rather than the close coupling state.

Example 5

Figure 22:
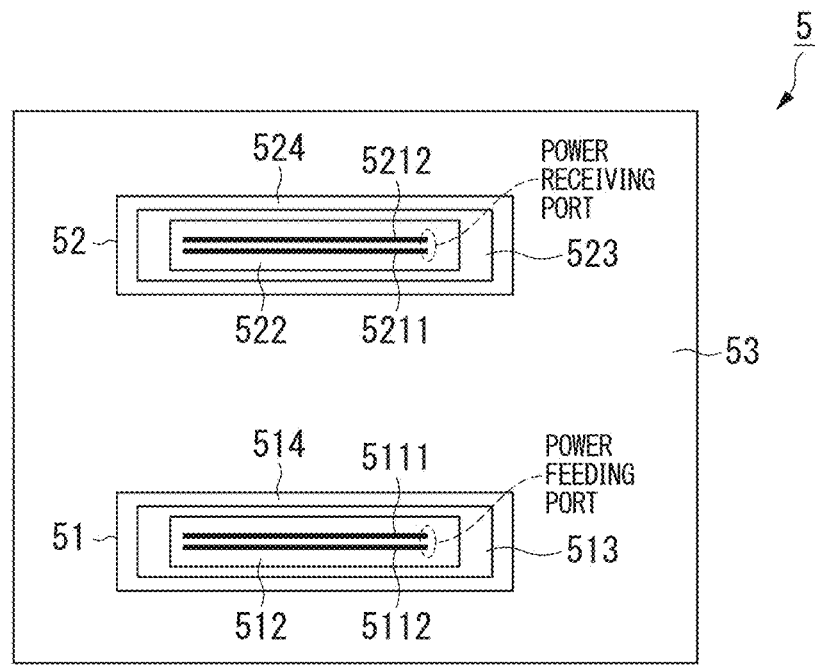
FIG. 22 is a model diagram for simulations for verifying the effect of the electric power transmission device of the second example in the third embodiment of the present invention.

FIG. 22 is a model diagram for simulations for verifying the effect of an electric power transmission device 5 according to the third embodiment.

Next, simulation results obtained by verifying the effect of the second example in the third embodiment of the present invention will be described with reference to FIG. 22.

In FIG. 22, the electric power transmission device 5 includes a power transmitting unit 51 and a power receiving unit 52. In addition, the power transmitting unit 51 and the power receiving unit 52 are covered with the highly conductive medium, seawater 53. The above-described power transmitting unit 51 includes a spiral coil 5111, a loop coil 5112, an internal dielectric (first power-transmitting-side containment member) 512, an external dielectric (second power-transmitting-side containment member) 513, and a covering dielectric (third power-transmitting-side containment member) 514. The above-described power receiving unit 52 includes a spiral coil 5211, a loop coil 5212, an internal dielectric (first power-receiving-side containment member) 522, an external dielectric (second power-receiv-ing-side containment member) 523, and a covering dielectric (third power-receiving-side containment member) 524.

Figure 23:
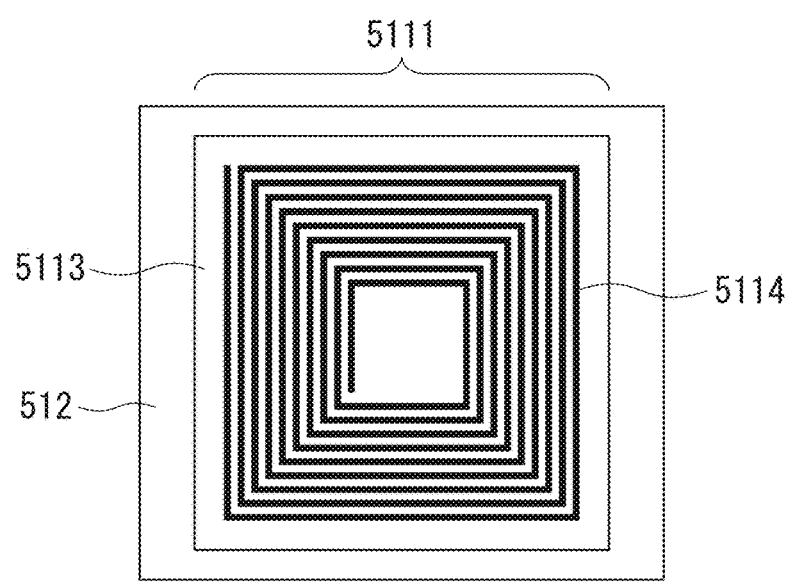
FIG. 23 is a model diagram of a spiral coil viewed from the top surface in the second example of the third embodiment of the present invention.
Figure 24:
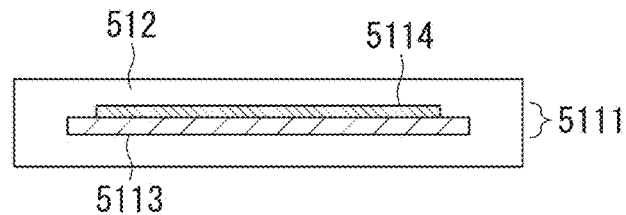
FIG. 24 is a model diagram of the spiral coil viewed from the side surface in the second example of the third embodiment of the present invention.

FIGS. 23 and 24 are model diagrams of the spiral coil 5111 (spiral coil 5211) viewed from the top surface and the side surface in the second example of the third embodiment, respectively.

The spiral coil 5111 includes a dielectric substrate 5113 formed of a fluorine resin and a spiral wiring 5114 formed of a metal wiring. The dielectric substrate 5113 is configured to have a thickness of 1 mm, a length of 270 mm, and a width of 270 mm. The spiral wiring 5114 is configured to have a length of 260 mm, a width of 260 mm, a wiring width of 6 mm, a thickness of 50 μm, and 10 turns.

Figure 25:
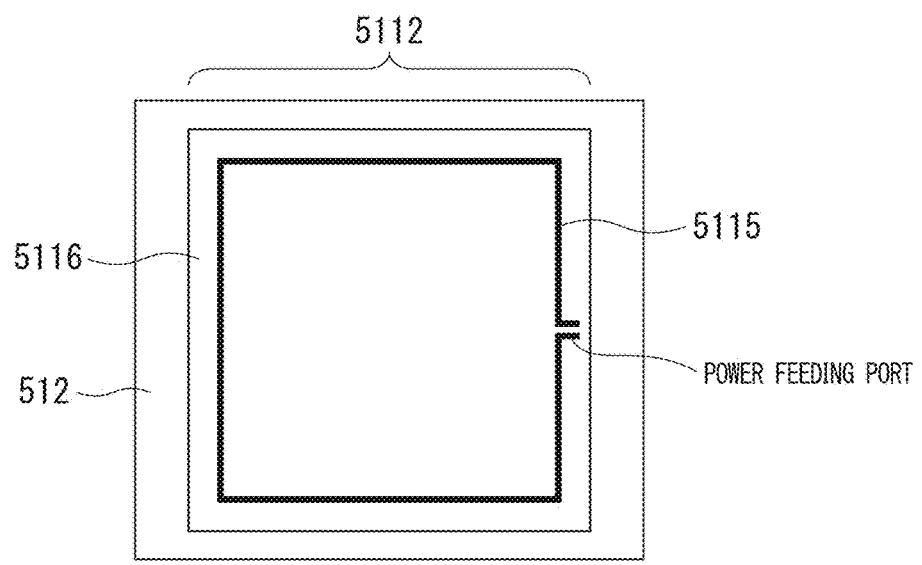
FIG. 25 is a model diagram of a loop coil viewed from the top surface in the second example of the third embodiment of the present invention.
Figure 26:
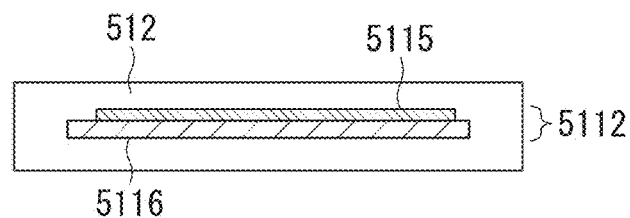
FIG. 26 is a model diagram of the loop coil viewed from the side surface in the second example of the third embodiment of the present invention.

FIGS. 25 and 26 are model diagrams of the loop coil 5112 (loop coil 5212) viewed from the top surface and the side surface in the second example of the third embodiment, respectively.

The loop coil 5112 includes a dielectric substrate 5115 formed of a fluorine resin and a loop wiring 5116 formed of a metal wiring. The dielectric substrate 5115 is configured to have a thickness of 1 mm, a length of 270 mm, and a width of 270 mm. The loop wiring 5116 is configured to have a length of 260 mm, a width of 260 mm, a wiring width of 6 mm, and a thickness of 50 μm.

A distance of 3 mm between the spiral coil 5111 and the loop coil 5112 within the internal dielectric 512 is separated. A high electric power transmission efficiency of 55% or more was obtained by simulating the above-described power transmitting unit 51 and the above-described power receiving unit 52 separated by a distance of 10 cm in seawater. Also, the resonance frequency is about 1 MHz.

In this example, the power receiving unit 52 has the same configuration as the power transmitting unit 51. However, the configuration shown here is an example and a similar effect is obtained even when the power transmitting unit 51 and the power receiving unit 52 do not have the same configuration.

As in the second example of the third embodiment, mass productivity is increased by forming a coil on a dielectric substrate, manufacturing precision is high, characteristic variation for each individual can be reduced. Thus, it is possible to make the resonance frequencies of the power transmitting unit and the power receiving unit equal and obtain higher electric power transmission efficiency.

Example 6

Figures 27, 28:
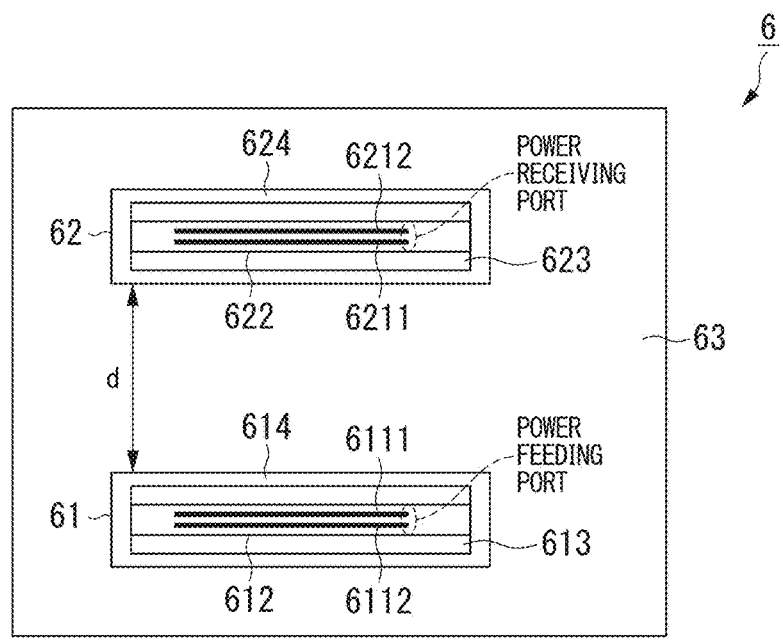
FIG. 27 is a diagram illustrating a table in which conductivities of various types of media related to electric power transmission and specific dielectric constants are summarized.
FIG. 28 is a model diagram for simulations for verifying the effect of the electric power transmission device 6 as a third example in the third embodiment of the present invention.

FIG. 28 is a model diagram for simulations for verifying the effect of an electric power transmission device 6 according to the third embodiment of the present invention.

Next, as the third example of the third embodiment of the present invention, a specific simulation result verifying its effect will be described with reference to FIG. 28.

In FIG. 28, the electric power transmission device 6 includes a power transmitting unit 61 and a power receiving unit 62. In addition, the power transmitting unit 61 and the power receiving unit 62 are covered with seawater 63. The power transmitting unit 61 includes a power transmission coil constituted of a spiral coil 6111 and a spiral coil 6112, a first power-transmitting-side containment member 612 constituted of a first dielectric configured to cover the power transmission coil, a second power-transmitting-side containment member 613 constituted of a second dielectric configured to cover the first power-transmitting-side containment member 612, a third power-transmitting-side containment member 614 constituted of a third dielectric configured to cover the second power-transmitting-side containment member 613. In addition, like the power transmitting unit 61, the power receiving unit 62 includes a power reception coil constituted of a spiral coil 6211 and a spiral coil 6212, a first power-receiving-side containment member 622, a second power-receiving-side containment member 623, and a third power-receiving-side containment member 624.

Here, the simulation model in the third example of the third embodiment has a structure in which the second power-transmitting-side containment member 613 (second power-receiving-side containment member 623) covers only an upper surface and a lower surface (a surface parallel to a coil surface) of the first power-transmitting-side containment member 612 (first power-receiving-side containment member 622) as illustrated in FIG. 28. That is, the first power-transmitting-side containment member 612 (first power-receiving-side containment member 622) is inserted into the second power-transmitting-side containment member 613 (second power-receiving-side containment member 623). On the other hand, a side surface (a surface perpendicular to the coil surface) of the first power-transmitting-side containment member 612 (first power-receiving-side containment member 622) has a structure directly covered with the third power-transmitting-side containment member 614 (third power-receiving-side containment member 624).

Figure 29:
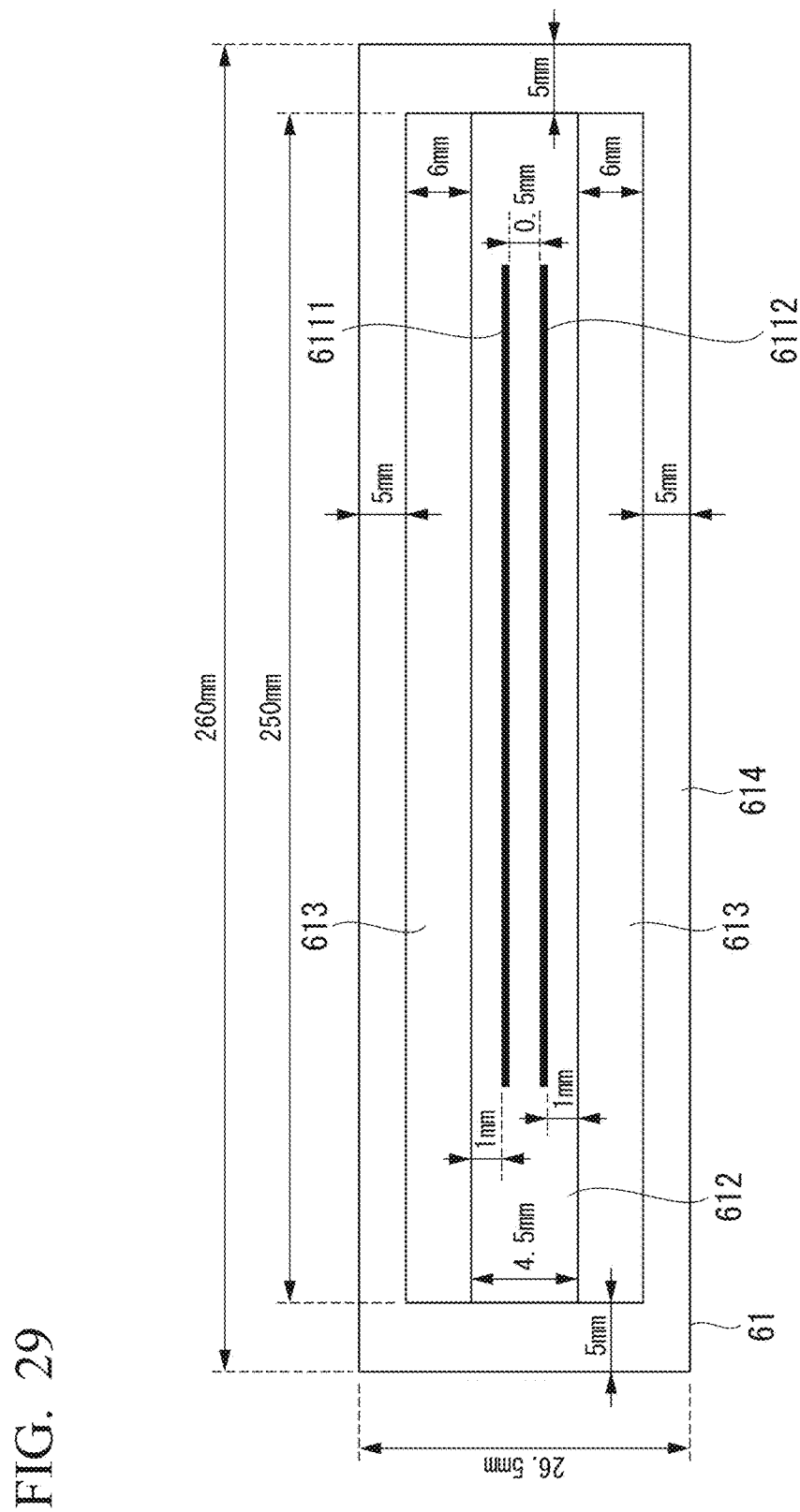
FIG. 29 is a side view of the power transmitting unit in the third example of the third embodiment of the present invention.

FIG. 29 is a model diagram of the power transmitting unit 61 viewed from the side surface in the third example of the third embodiment.

The first power-transmitting-side containment member 612 is formed of two fluorine resins, each of which has a length of 250 mm, a width of 250 mm, and a height of 4.5 mm. The specific dielectric constant is 10.2 and the dielectric tangent is 0.0023.

In addition, the second power-transmitting-side containment member 613 is formed of two fluorine resins, each of which has a length of 250 mm, a width of 250 mm, and a height of 6 mm. The specific dielectric constant is 6.2 and the dielectric tangent is 0.0019.

In addition, the third power-transmitting-side containment member 614 is formed of acryl having a length of 260 mm, a width of 260 mm, a height of 26.5 mm, and a thickness of 5 mm. The specific dielectric constant of acryl is 3.3 and the dielectric tangent thereof is 0.04.

Also, in the third example of the third embodiment, the power receiving unit 62 was also simulated in the same configuration as that of the above-described power transmitting unit 61.

Figure 30:
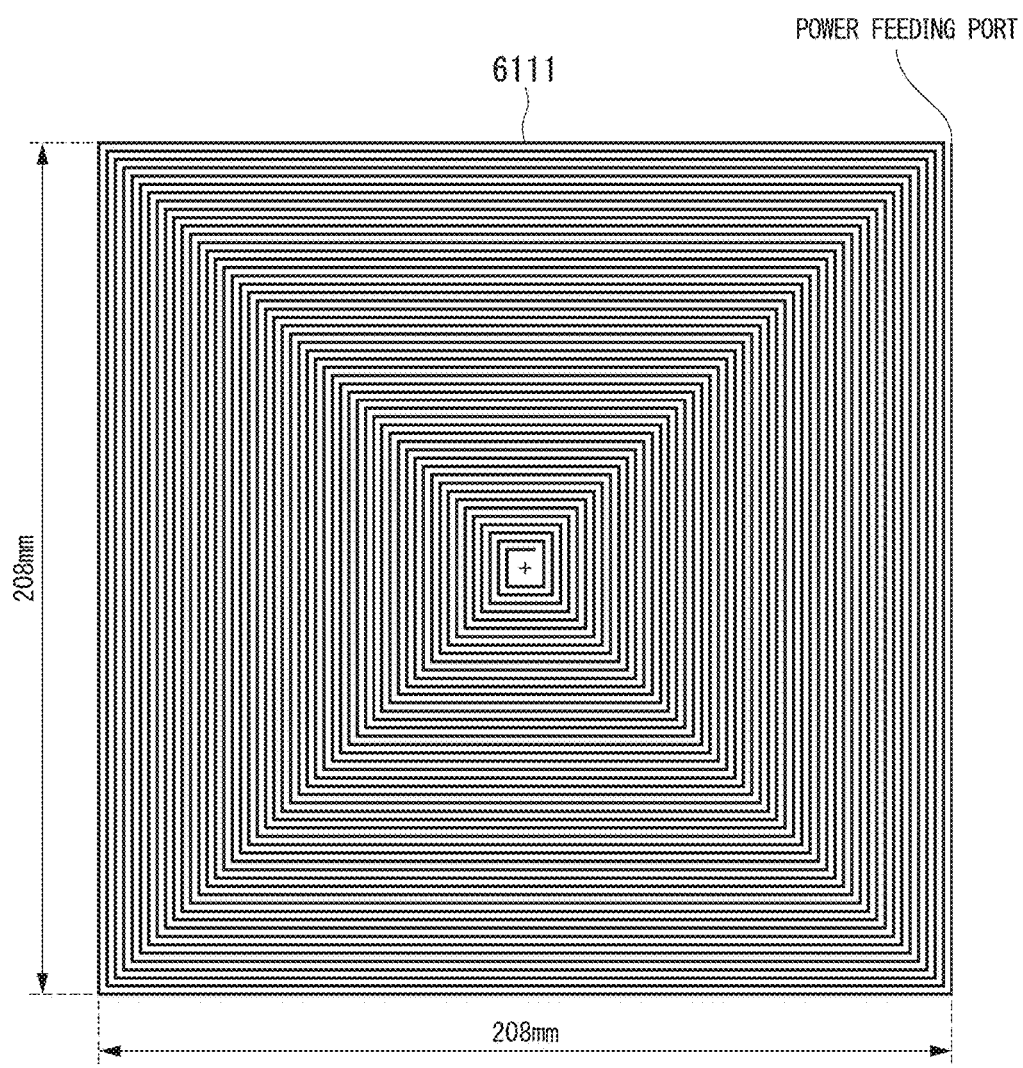
FIG. 30 is a model view of a spiral coil in the third example of the third embodiment of the present invention viewed from the power receiving unit side.
Figure 31:
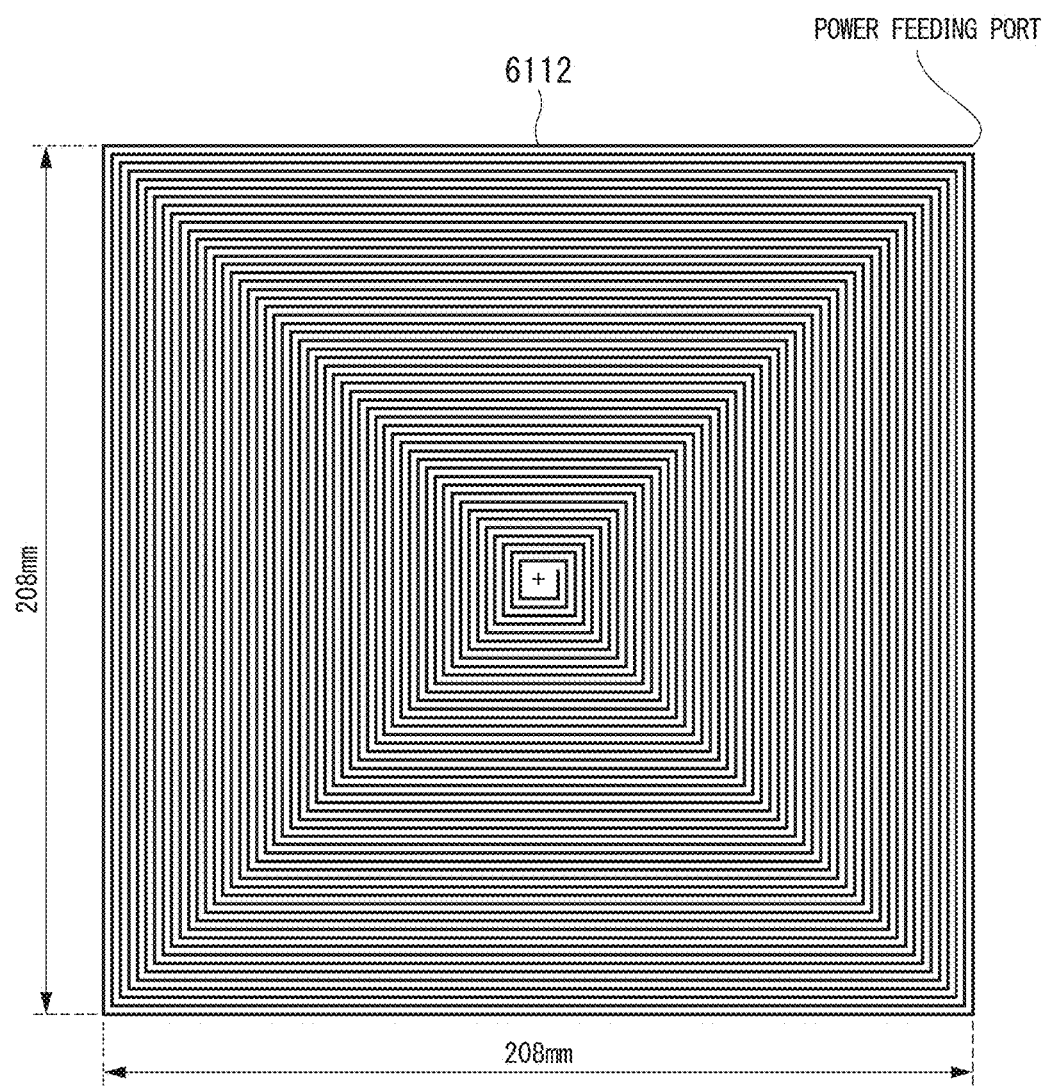
FIG. 31 is a model view of the spiral coil in the third example of the third embodiment of the present invention viewed from the power receiving unit side.

FIGS. 30 and 31 are model views of spiral coils 6111 and 6112 of the power transmitting unit 61 in the third example of the third embodiment viewed from the power receiving unit side, respectively.

The spiral coil 6111 is constituted of a wiring formed of a 50-turn conductor having an outer periphery of 208 mm. A diameter of the wiring is 1 mm and an interval of the wiring is 1 mm. The spiral coil 6112 has the same size as the spiral coil 6111. The spiral coil 6111 and the spiral coil 6112 are disposed to be separated by a distance of 0.5 mm. An end portion of the outermost periphery of the spiral coil 6111 and an end portion of the outermost periphery of the spiral coil 6112 serve as power feeding ports of high-frequency electric power. The direction of the spiral of the spiral coil 6111 and the direction of the spiral of the spiral coil 6112 are configured to be directions in which the magnetic field is generated in the same direction via the power feeding ports.

Figure 32:
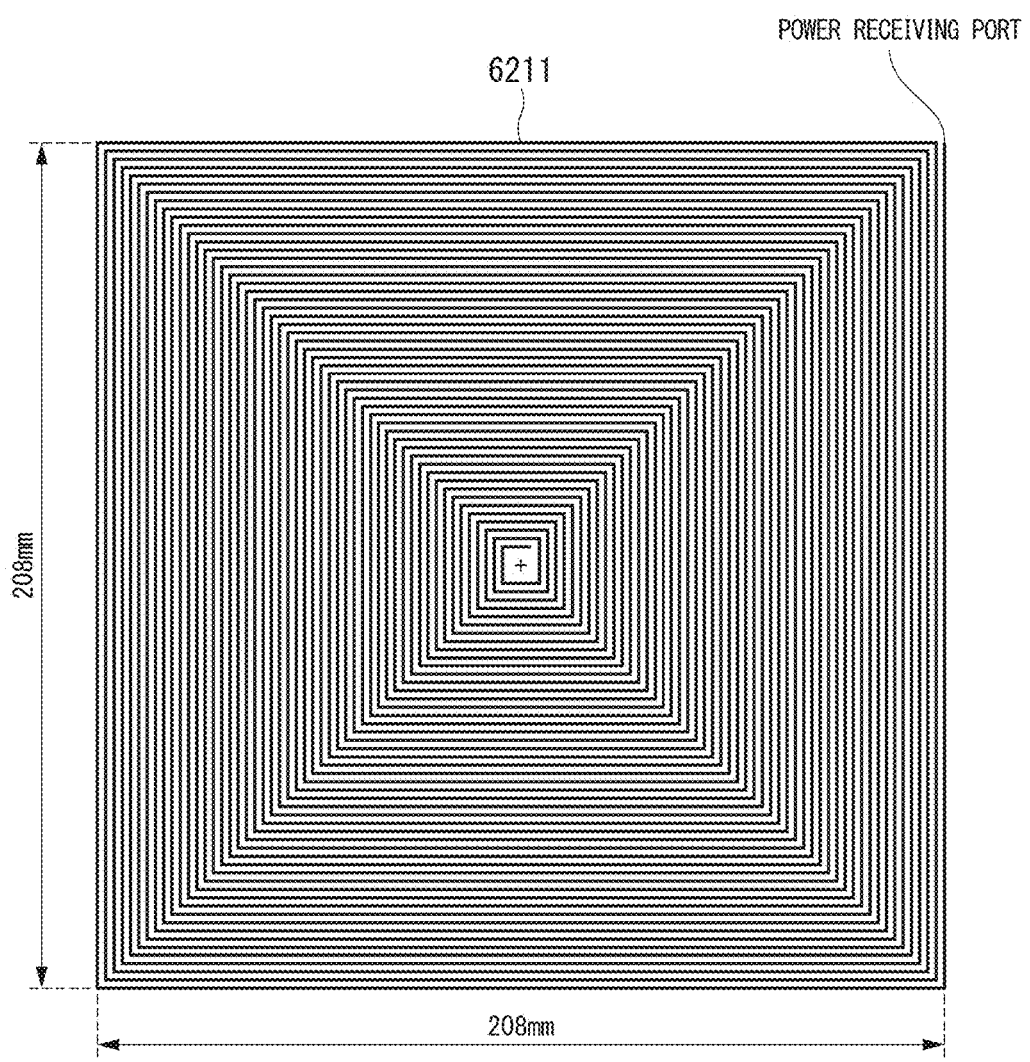
FIG. 32 is a model view of a spiral coil in the third example of the third embodiment of the present invention viewed from the power transmitting unit side.
Figure 33:
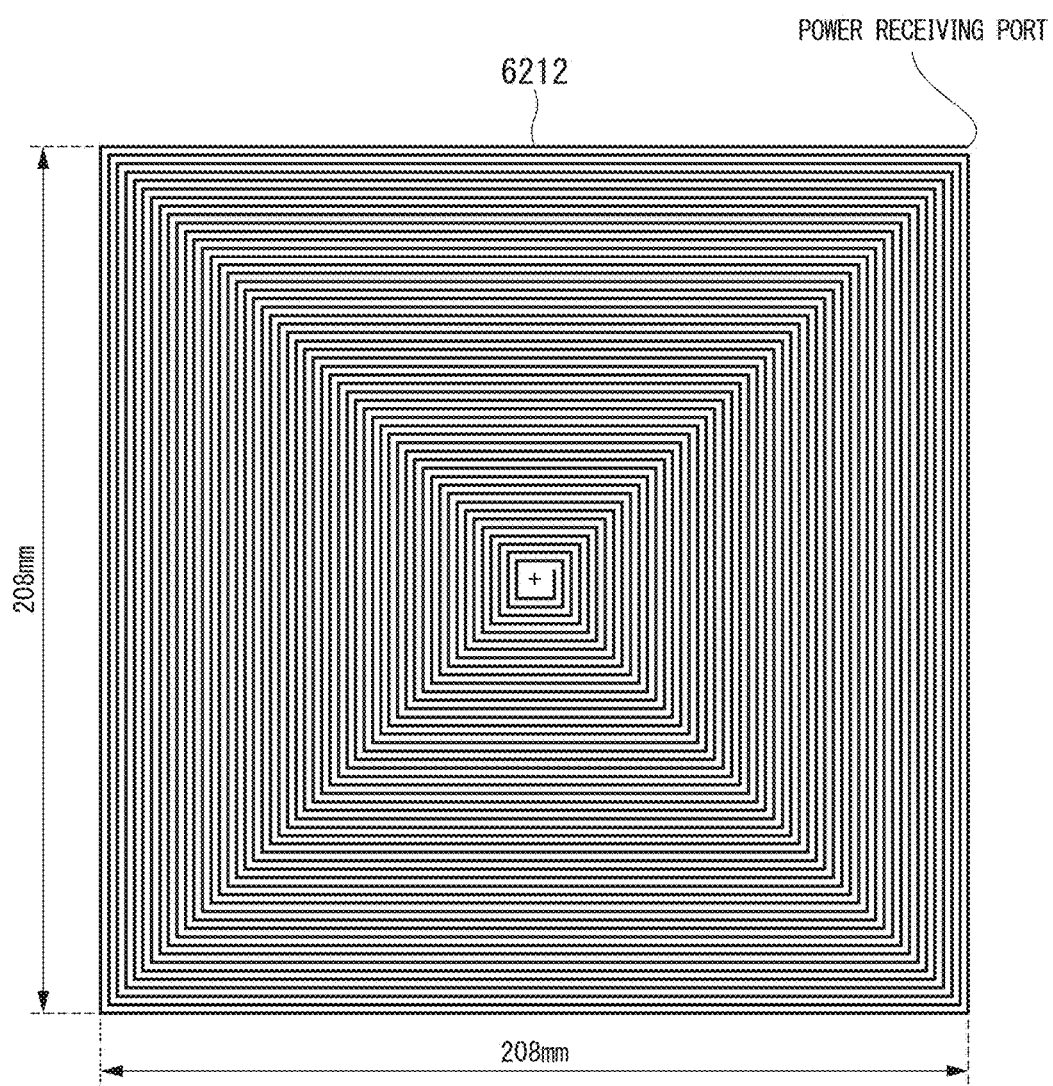
FIG. 33 is a model view of the spiral coil in the third example of the third embodiment of the present invention viewed from the power transmitting unit side.

FIGS. 32 and 33 are model views of spiral coils 6211 and 6212 of the power receiving unit 62 in the third example of the third embodiment viewed from the power transmitting unit side, respectively.

A spiral coil 6211 is constituted of a wiring formed of a 50-turn conductor having an outer periphery of 208 mm. A diameter of the wiring is 1 mm and an interval of the wiring is 1 mm. The spiral coil 6212 has the same size as the spiral coil 6211. The spiral coil 6211 and the spiral coil 6212 are disposed to be separated by a distance of 0.5 mm. An end portion of the outermost periphery of the spiral coil 6211 and an end portion of the outermost periphery of the spiral coil 6212 serve as power receiving ports of high-frequency power. The direction of the spiral of the spiral coil 6211 and the direction of the spiral of the spiral coil 6212 are configured to be directions in which the magnetic field is generated in the same direction via the power receiving ports.

Figure 34:
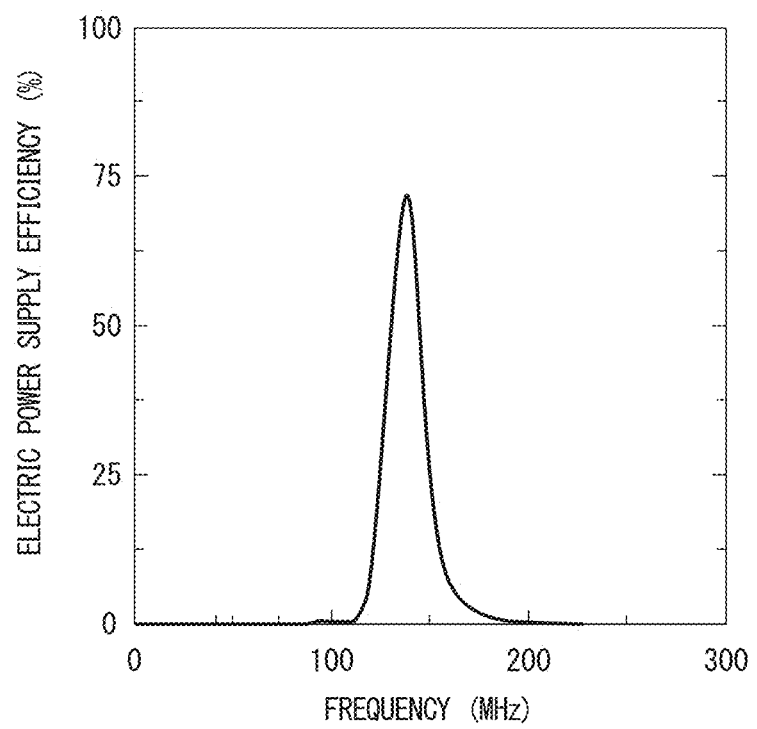
FIG. 34 is a graph illustrating simulation results of the electric power transmission efficiency in the third example of the third embodiment of the present invention.

A high electric power transmission efficiency of 72% or more was obtained by simulating the above-described power transmitting unit 61 and the above-described power receiving unit 62 separated by a distance of 10 cm in seawater as illustrated in FIG. 34. Also, the resonance frequency is about 140 MHz.

In the third example of the third embodiment, the power receiving unit 62 has the same configuration as the power transmitting unit 61. However, the configuration shown here is an example and a similar effect is obtained even when the power transmitting unit 61 and the power receiving unit 62 do not have the same configuration.

By configuring a plurality of dielectrics to cover a coil as indicated by simulations according to the third example of the third embodiment, high-frequency waves can be obtained without increasing loss within the dielectric and high electric power transmission efficiency is obtained.

Priority is claimed on Japanese Patent Application No. 2012-191649, filed Aug. 31, 2012, the content of which is incorporated herein by reference.

INDUSTRIAL APPLICABILITY

An electric power transmission device capable of increasing a distance of wireless electric power transmission in a highly conductive medium such as seawater can be provided.

DESCRIPTION OF REFERENCE SYMBOLS

1 Electric power transmission device
11 Power transmitting unit
111 Power transmission coil
112 Power-transmitting-side containment member
113 Power-transmitting-side impedance adjustment unit
12 Power receiving unit
121 Power reception coil
122 Power-receiving-side containment member
123 Power-receiving-side impedance adjustment unit
13 Highly conductive medium
14 Electric power supply source
15 Submarine
16 Submarine
17 Submarine
18 Power cable
19 Power cable
2 Electric power transmission device
21 Power transmitting unit
211 Power transmission coil
212 First power-transmitting-side containment member
213 Second power-transmitting-side containment member
22 Power receiving unit 221 Power reception coil
222 First power-receiving-side containment member
223 Second power-receiving-side containment member
23 Highly conductive medium
3 Electric power transmission device
31 Power transmitting unit
311 Power transmission coil
312 First power-transmitting-side containment member
313 Second power-transmitting-side containment member
314 Third power-transmitting-side containment member
32 Power receiving unit
321 Power reception coil
322 First power-receiving-side containment member
323 Second power-receiving-side containment member
324 Third power-receiving-side containment member
33 Highly conductive medium
4 Electric power transmission device
41 Power transmitting unit
411 Helical coil
421 Helical coil
412 Internal dielectric
422 Internal dielectric
413 External dielectric
423 External dielectric
414 Covering dielectric
424 Covering dielectric
42 Power receiving unit
43 Seawater
5 Electric power transmission device
51 Power transmitting unit
5111 Spiral coil
5211 Spiral coil
5112 Loop coil
5212 Loop coil
5113 Dielectric substrate
5114 Spiral wiring
5115 Dielectric substrate
5116 Loop wiring
512 Internal dielectric
522 Internal dielectric
513 External dielectric
523 External dielectric
514 Covering dielectric
524 Covering dielectric
52 Power receiving unit
53 Seawater
6 Electric power transmission device
61 Power transmitting unit
6111 Spiral coil
6112 Spiral coil
6211 Spiral coil
6212 Spiral coil
612 First power-transmitting-side containment member
613 Second power-transmitting-side containment member
614 Third power-transmitting-side containment member
62 Power receiving unit
622 First power-receiving-side containment member
623 Second power-receiving-side containment member
624 Third power-receiving-side containment member
63 Seawater

The invention claimed is:

1. An electric power transmission device comprising:
a power transmitting unit including a first coil having a first capacitance (C1) contained in a first dielectric member;
a power receiving unit including a second coil having a second capacitance (C2) contained in a second dielectric member; and
a highly conductive medium that entirely covers the power transmitting unit and the power receiving unit so as to form a third capacitance (C3) in connection with the power transmitting unit and the power receiving unit,
wherein the power transmitting unit and the power receiving unit are positioned close to each other with an interval distance (d) depending on the first capacitance, the second capacitance, and the third capacitance, and the interval distance between the power transmitting unit and the power receiving unit depends on a relationship of $30 > C3 \cdot d/(C1+C2) > 0.5$.

2. An electric power transmission device comprising:
a power transmitting unit including a first coil having a first capacitance (C1) contained in a first dielectric member;
a power receiving unit including a second coil having a second capacitance (C2) contained in a second dielectric member; and
a highly conductive medium that entirely covers the power transmitting unit and the power receiving unit so as to form a third capacitance (C3) in connection with the power transmitting unit and the power receiving unit,
wherein the power transmitting unit and the power receiving unit are positioned close to each other with an interval distance (d) depending on the first capacitance, the second capacitance, and the third capacitance, and impedance matching is implemented using a first variable capacitance (C1') for the power transmitting unit and a second variable capacitance (C2') for the power receiving unit so as to compensate for fluctuations of the third capacitance due to the interval distance being changed.

3. An electric power transmission device comprising:
a power transmitting unit including a first coil having a first capacitance (C1) contained in a first dielectric member;
a power receiving unit including a second coil having a second capacitance (C2) contained in a second dielectric member; and
a highly conductive medium that entirely covers the power transmitting unit and the power receiving unit so as to form a third capacitance (C3) in connection with the power transmitting unit and the power receiving unit,
wherein the power transmitting unit and the power receiving unit are positioned close to each other with an interval distance (d) depending on the first capacitance, the second capacitance, and the third capacitance, and a length (d1) of the first dielectric member along the first coil and an outer diameter (d2) of the first coil satisfy a relationship of $d1/d2 > 1.2$.

4. An electric power transmission device comprising:
a power transmitting unit including a first coil having a first capacitance (C1) contained in a first dielectric member;
a power receiving unit including a second coil having a second capacitance (C2) contained in a second dielectric member; and
a highly conductive medium that entirely covers the power transmitting unit and the power receiving unit so as to form a third capacitance (C3) in connection with the power transmitting unit and the power receiving unit, wherein the power transmitting unit and the power receiving unit are positioned close to each other with an interval distance (d) depending on the first capacitance, the second capacitance, and the third capacitance, and the highly conductive medium has conductivity greater than $1 \times 10^{-4}$ and a specific dielectric constant greater than 1.

* * * * *